United States Patent
Ouedraogo et al.

(10) Patent No.: US 12,008,052 B2
(45) Date of Patent: Jun. 11, 2024

(54) METHOD AND APPARATUS FOR ENCAPSULATING IMAGES IN A FILE

(71) Applicant: CANON KABUSHIKI KAISHA, Tokyo (JP)

(72) Inventors: Naël Ouedraogo, Maure de Bretagne (FR); Frédéric Maze, Langan (FR); Franck Denoual, Saint Domineuc (FR); Hervé Ruellan, Rennes (FR); Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 17/044,763

(22) PCT Filed: Apr. 4, 2019

(86) PCT No.: PCT/EP2019/058511
§ 371 (c)(1),
(2) Date: Oct. 1, 2020

(87) PCT Pub. No.: WO2019/193097
PCT Pub. Date: Oct. 10, 2019

(65) Prior Publication Data
US 2021/0109970 A1    Apr. 15, 2021

(30) Foreign Application Priority Data

Apr. 5, 2018   (GB) .................................. 1805711
Sep. 24, 2018  (GB) .................................. 1815558
Mar. 8, 2019   (GB) .................................. 1903174

(51) Int. Cl.
*G06F 16/908*   (2019.01)
*G06F 16/71*    (2019.01)
(Continued)

(52) U.S. Cl.
CPC ............ *G06F 16/908* (2019.01); *G06F 16/71* (2019.01); *G06F 16/906* (2019.01); *G06F 16/93* (2019.01);
(Continued)

(58) Field of Classification Search
CPC ...... G06F 16/908; G06F 16/906; G06F 16/93; G06F 16/71
See application file for complete search history.

(56) References Cited

U.S. PATENT DOCUMENTS

2006/0195475 A1   8/2006  Logan
2009/0251337 A1   10/2009 Marggraff
(Continued)

FOREIGN PATENT DOCUMENTS

CN   105052167 A   11/2015
CN   106031172 A   10/2016
(Continued)

OTHER PUBLICATIONS

Information Technology—MPEG Systems Technologies—Part 12: Image File Format, ISO/IEC JTC 1/SC 29 N, ISO/IEC CD 23008-12 1st Edition, Doc. No. Nxxxxx.
(Continued)

*Primary Examiner* — Baoquoc N To
(74) *Attorney, Agent, or Firm* — Canon U.S.A., Inc. IP Division

(57) ABSTRACT

The present invention concerns a method of encapsulating images in a file, wherein the method comprises determining a grouping type based on a capture mode of the images; generating a grouping data structure describing the images as a group, the grouping data structure comprising image identifiers of the images of the group; and embedding the grouping data structure, the grouping type and the images in the file.

25 Claims, 9 Drawing Sheets

(51) Int. Cl.
*G06F 16/906* (2019.01)
*G06F 16/93* (2019.01)
*H04N 21/81* (2011.01)
*H04N 21/854* (2011.01)

(52) U.S. Cl.
CPC ... *H04N 21/8153* (2013.01); *H04N 21/85406* (2013.01)

(56) References Cited

U.S. PATENT DOCUMENTS

| | | | |
|---|---|---|---|
| 2011/0292250 A1 | 12/2011 | Nakajima | |
| 2012/0106852 A1 | 5/2012 | Khawand et al. | |
| 2013/0265465 A1* | 10/2013 | Shimizu | H04N 23/61 |
| | | | 348/239 |

FOREIGN PATENT DOCUMENTS

| | | |
|---|---|---|
| CN | 107750462 A | 3/2018 |
| EP | 3777221 A1 | 2/2021 |
| GB | 2585052 A | 12/2020 |
| JP | 2009260921 A | 11/2009 |
| JP | 2009266157 A | 11/2009 |
| KR | 10-2015-0097723 A | 8/2015 |
| KR | 10-2018-0016519 A | 2/2018 |
| WO | 2009/131034 A1 | 10/2009 |
| WO | 2016/128613 A1 | 8/2016 |

OTHER PUBLICATIONS

David Singer, Suggested Corrections to 23008-12 FDIS, MPEG Meeting, Jun. 22-26, 2015, Motion Picture Expert Group or ISO/IEC JTC1/SC29/WG11, Doc No. m36366, 55 pages, Warsaw, XP030064734.

Miska M. Hannuksela, et al., High Efficiency Image File Format: Technical Overview and Examples, MPEG Meeting, Motion Picture Expert Group or ISO/IEC JTC1/SC29/WG11/MPEG2015/N15695, Oct. 19-23, 2015, 22 pages, Geneva, XP030022383.

Frederic Maze, et al., Signaling of logically grouped image shots in HEIF, MPEG Meeting, Apr. 16-20, 2018, Motion Picture Expert Group or ISO/IEC JTC1/SC29/WG11 MPEG2018/M42564, 7 pages, San Diego, XP030070903.

Herve Ruellan, et al., [HEIF] Support for Bracketing, MPEG Meeting, Motion Picture Expert Group or ISO/IEC JTC1/SC29/WG11 MPEG2018/M44838, Oct. 2018, 8 pages, Macao, XP0030192113.

Information Technology—MPEG Systems Technologies—Part 12: Image File Format, ISO/IEC JTC 1/SC 29 N, ISO/IEC CD 23008-12 1st Edition, Doc. No. N14642.

* cited by examiner

METHOD AND APPARATUS FOR ENCAPSULATING IMAGES IN A FILE

CROSS-REFERENCE TO RELATED APPLICATIONS

This application is the National Phase application of PCT Application No. PCT/EP2019/058511, filed on Apr. 4, 2019 and titled "METHOD AND APPARATUS FOR ENCAPSULATING IMAGES IN A FILE". This application claims the benefit under 35 U.S.C. § 119(a)-(d) of United Kingdom Patent Application No. 1805711.7, filed on Apr. 5, 2018, United Kingdom Patent Application No. 1815558.0, filed on Sep. 24, 2018, and United Kingdom Patent Application No. 1903174.9, filed on Mar. 8, 2019. The above cited patent applications are incorporated by reference herein in their entireties.

The present disclosure concerns a method and a device for encapsulating multiple images in a file.

Modern cameras provide different capture modes to capture images. Some of these capture modes result in capturing series of images. For example, they offer bracketing modes where several images are captured, the value of one parameter of the capture varying from one capture image to another. The parameter may be the exposure time, the value of the white, or the focus for example. The image burst mode provides the ability to take a series of images with no delay. It can be used to capture a fast event in sport for example. Panorama mode allows obtaining a series of overlapping images to reconstitute a large view of a scene.

Images captured by a camera are stored on a storage device like a memory card for example. The images are typically encoded to reduce the size of data on the storage device. Many encoding standard may be used, like JPEG or the more recent HEVC standard.

The HEVC standard defines a profile for the encoding of still images and describes specific tools for compressing single still images or bursts of still images. An extension of the ISO Base Media File Format (ISOBMFF) used for such kind of image data has been proposed for inclusion into the ISO/IEC 23008 standard, in Part 12, under the name: "HEIF or High Efficiency Image File Format".

HEIF (High Efficiency Image File Format) is a standard developed by the Moving Picture Experts Group (MPEG) for storage and sharing of images and image sequences.

The MIAF (Multi-Image Application Format) is a standard developed by MPEG into ISO/IEC 23000 standard part 22 that defines a set of constraints on HEIF specification to precise interoperability points for creation, reading, parsing and decoding of images embedded in the High Efficiency Image File (HEIF) format.

While providing limited grouping mechanisms and limited mechanisms to describe properties of encoded images, the HEIF and MIAF file formats do not provide efficient grouping and properties description mechanisms adapted to gather and describe images and group of images resulting of a capture or edit according to one of the cited capture or collection modes.

The present invention has been devised to address one or more of the foregoing concerns. It concerns the extension of the grouping and the properties mechanisms in HEIF adapted to capture modes and editing modes resulting in a plurality of images.

According to another aspect of the invention, there is provided a method of encapsulating images in a file, wherein the method comprises:

determining a grouping type based on a capture mode of the images;

generating a grouping data structure describing the images as a group, the grouping data structure comprising image identifiers of the images of the group;

embedding the grouping data structure, the grouping type and the images in the file.

In an embodiment, the grouping type is comprised within the grouping data structure.

In an embodiment:

the grouping data structure comprises a generic capture mode type; and the grouping type is comprised within a property data structure associated with the images of the group to characterize the generic capture mode type.

In an embodiment, the property data structure further comprises parameters associated with the grouping type.

In an embodiment:

the grouping data structure comprises a generic capture mode type; and the grouping type is comprised as an additional parameter within the grouping data structure.

In an embodiment, a property data structure associated with the grouping data structure is further embedded within the file.

According to another aspect of the invention, there is provided a method of encapsulating images in a file, wherein the method comprises:

determining a label parameter describing information to annotate images;

and generating a grouping data structure describing the images as a group, the grouping data structure comprising image identifiers of the images of the group;

embedding the grouping data structure, the label parameter and the images in the file.

According to another aspect of the invention, there is provided a method of encapsulating images in a file, wherein the method comprises:

determining a grouping type based on a capture mode of the images;

generating a reference data structure associated with a first image and referencing a second image, the reference data structure comprising the grouping type;

embedding the reference data structure and the images in the file.

According to another aspect of the invention, there is provided a method of reading images in a file, wherein the method comprises:

reading a grouping type based on a capture mode of the images;

reading a grouping data structure describing the images as a group, the grouping data structure comprising image identifiers of the images of the group;

reading the images identified in the grouping data structure according to the grouping type.

In an embodiment, the grouping type is comprised within the grouping data structure.

In an embodiment:

the grouping data structure comprises a generic capture mode type; and the grouping type is comprised within a property data structure associated with the images of the group to characterize the generic capture mode type.

In an embodiment, the property data structure further comprises parameters associated with the grouping type.

In an embodiment:
  the grouping data structure comprises a generic capture mode type; and
  the grouping type is comprised as an additional parameter within the grouping data structure.

In an embodiment, a property data structure associated with the grouping data structure is further embedded within the file.

According to another aspect of the invention, there is provided a method of reading images in a file, wherein the method comprises:
  reading a label parameter describing information to annotate images; and
  reading a grouping data structure describing the images as a group, the grouping data structure comprising image identifiers of the images of the group;
  reading the images identified in the grouping data structure according to the label parameter.

According to another aspect of the invention, there is provided a method of reading images in a file, wherein the method comprises:
  reading a grouping type based on a capture mode of the images;
  reading a reference data structure associated with a first image and referencing a second image, the reference data structure comprising the grouping type;
  reading the first and second images in the file.

In an embodiment, data structures are boxes as defined in ISO Base Media File Format.

In an embodiment, a grouping type is defined for at least one of the capture modes comprising auto exposure bracketing mode, white balance bracketing mode, focus bracketing mode, flash exposure bracketing mode, depth of field bracketing mode, iso bracketing mode, time lapse mode, panorama mode, image burst mode, user collection mode, super resolution mode, multi-exposure mode, noise reduction mode, long-exposure noise reduction mode, vignetting compensation mode, and/or HDR capture mode.

In an embodiment, the grouping data structure is one of an EntityToGroup box, a SampleToGroup box, or a TrackGroup box as defined in ISO Base Media File Format.

In an embodiment, the property data structure is one of a SampleEntry box, a SampleGroupEntry box, a ItemFullProperty or a ItemProperty box as defined in ISO Base Media File Format.

According to another aspect of the invention, there is provided a device for encapsulating images in a file, wherein the device comprises circuitry configured for:
  determining a grouping type based on a capture mode of the images;
  generating a grouping data structure describing the images as a group, the grouping data structure comprising image identifiers of the images of the group;
  embedding the grouping data structure, the grouping type and the images in the file.

According to another aspect of the invention, there is provided a device for encapsulating images in a file, wherein the device comprises circuitry configured for:
  determining a label parameter describing information to annotate images; and
  generating a grouping data structure describing the images as a group, the grouping data structure comprising image identifiers of the images of the group;
  embedding the grouping data structure, the label parameter and the images in the file.

According to another aspect of the invention, there is provided a device for encapsulating images in a file, wherein the device comprises circuitry configured for:
  determining a grouping type based on a capture mode of the images;
  generating a reference data structure associated with a first image and referencing a second image, the reference data structure comprising the grouping type;
  embedding the reference data structure and the images in the file.

According to another aspect of the invention, there is provided a device for reading images in a file, wherein the device comprises circuitry configured for:
  reading a grouping type based on a capture mode of the images;
  reading a grouping data structure describing the images as a group, the grouping data structure comprising image identifiers of the images of the group;
  reading the images identified in the grouping data structure according to the grouping type.

According to another aspect of the invention, there is provided a device for reading images in a file, wherein the device comprises circuitry configured for:
  reading a label parameter describing information to annotate images; and
  reading a grouping data structure describing the images as a group, the grouping data structure comprising image identifiers of the images of the group;
  reading the images identified in the grouping data structure according to the label parameter.

According to another aspect of the invention, there is provided a device for reading images in a file, wherein the device comprises circuitry configured for:
  reading a grouping type based on a capture mode of the images;
  reading a reference data structure associated with a first image and referencing a second image, the reference data structure comprising the grouping type;
  reading the first and second images in the file.

According to another aspect of the invention, there is provided a computer program product for a programmable apparatus, the computer program product comprising a sequence of instructions for implementing a method according to the invention, when loaded into and executed by the programmable apparatus.

According to another aspect of the invention, there is provided a computer-readable storage medium storing instructions of a computer program for implementing a method according to the invention.

According to another aspect of the invention, there is provided a computer program which upon execution causes the method according to the invention to be performed.

According to another aspect of the invention, there is provided a method for encapsulating an encoded bitstream comprising entities (for example image items or tracks), the encapsulated bitstream comprising a data part and a metadata part. The method comprises:
  providing in the metadata part, entity information identifying one or more entities,
  providing in the metadata part, a grouping information chosen among a plurality of grouping information, signaling that the one or more entities identified by the entity information, form a group based on a predetermined criteria indicated by said grouping information, each grouping information indicating a different predetermined criteria, outputting said bitstream together with said provided information as an encapsulated data file.

In an embodiment, the encoded bitstream comprises encoded captured images or encoded samples representing captured images.

In an embodiment, the entity information identifies at least two entities.

In an embodiment, the method further comprising capturing said images by a capturing device based on capture features, wherein the predetermined criteria is related to at least one of the capture features of the capturing step.

In an embodiment, the grouping information is a four-letter code.

According to another aspect of the invention, there is provided a method for encapsulating an encoded bitstream representing entities (for example image items or tracks), the encapsulated bitstream comprising a data part and a metadata part.

The method comprises:
Providing in the metadata part, entity information identifying one or more entities,
Providing in the metadata part, a grouping information signaling that the at least two entities identified by the entity information, form a group based on at least one common property,
Providing property information about said a least one common property,
Providing linking information for respectively linking each one of the one or more entities identified by the entity information to the common property, and
Outputting said bitstream together with said provided information as an encapsulated data file.

In an embodiment, entity information identifies at least two entities and the linking information links each one of the at least two entities identified by the entity information to the common property.

In an embodiment, the property information signals for said at least one common property, at least two different values, and the linking information links each one of the at least two entities identified by the entity information to at least two different values of the common property.

In an embodiment, the linking information links each one of the at least two entities identified by the entity information to the at least two different values of the common property.

In an embodiment, the encoded bitstream comprises encoded captured images or encoded samples representing captured images.

In an embodiment, the method further comprising capturing said images by a capturing device based on capture features, wherein the common property is related to at least one of the capture features of the capturing step.

In an embodiment, the linking information is a parameter comprised in the grouping structure, said parameter taking different values for representing the properties.

In an embodiment, the linking information is a structure (for instance a box), associating property information to the group.

According to an aspect of the invention, there is provided a method of encapsulating media data in a file, wherein the method comprises:
generating a grouping data structure describing a group of entities, each entity corresponding to at least a portion of media data;
generating a property container data structure containing a property associated with a group of entities;
generating an association data structure comprising association information between the property and the grouping data structure;
generating a property data structure comprising the property container data structure and the association data structure; and
embedding the grouping data structure, the property data structure, and the media data in the file.

In an embodiment, the method further comprises:
generating a text property in the property container data structure comprising at least one text attribute associated with a group of entities and a language attribute associated with the at least one text attribute.

In an embodiment, the text property comprises a plurality of the same text attribute associated with a respective plurality of language attributes.

In an embodiment, the property container data structure comprises a first and second text properties, the first text property comprising a text attribute associated with a first language attribute, and the second text property comprising the text attribute associated with a second language attribute, the first language being different from the second language, and wherein the association data structure comprises association information between the first and second text properties, and the grouping data structure.

In an embodiment, the text property comprises a plurality of text attributes comprising a name text attribute, a description text attribute, and a tag text attribute.

In an embodiment, the method comprises:
generating at least one of a name text property, a description text property, and/or a tag text property in the property container data structure, each of the text properties comprising at least a text attribute associated with a group of entities and a language attribute associated with the text attribute.

In an embodiment, each text property comprises a plurality of the same text attribute associated with a respective plurality of language attributes.

In an embodiment, the property container data structure comprises a first and second text properties, the first text property comprising a text attribute associated with a first language attribute, and the second text property comprising the text attribute associated with a second language attribute, the first language being different from the second language, and wherein the association data structure comprises association information between the first and second text properties, and the grouping data structure.

In an embodiment, the association data structure further comprises at least an association of a property with an entity.

According to another aspect of the invention, there is provided a method of encapsulating media data in a file, wherein the method comprises:
generating a grouping data structure describing a group of entities, each entity corresponding to at least a portion of media data;
generating a text property in the grouping data structure comprising at least a text attribute associated with a group of entities and a language attribute associated with the text attribute; and
embedding the media data, and the grouping data structure in the file.

In an embodiment, the text property comprises a plurality of the same text attribute associated with a respective plurality of language attributes.

In an embodiment, the text property comprises a plurality of text attributes comprising a name text attribute, a description text attribute, and a tag text attribute.

According to another aspect of the invention, there is provided a method of reading media data in a file, wherein the method comprises:
- reading a grouping data structure describing a group of entities, each entity corresponding to at least a portion of media data;
- reading a property container data structure containing a property associated with a group of entities;
- reading an association data structure comprising association information between the property and the grouping data structure;
- reading a property data structure comprising the property container data structure and the association data structure; and
- reading the media data identified in the grouping data structure according to the property.

In an embodiment, the method further comprises:
- reading a text property in the property container data structure comprising at least one text attribute associated with a group of entities and a language attribute associated with the at least one text attribute.

In an embodiment, the text property comprises a plurality of the same text attribute associated with a respective plurality of language attributes.

In an embodiment, the property container data structure comprises a first and second text properties, the first text property comprising a text attribute associated with a first language attribute, and the second text property comprising the text attribute associated with a second language attribute, the first language being different from the second language, and wherein the association data structure comprises association information between the first and second text properties, and the grouping data structure.

In an embodiment, the text property comprises a plurality of text attributes comprising a name text attribute, a description text attribute, and a tag text attribute.

In an embodiment, the method comprises:
- reading at least one of a name text property, a description text property, and/or a tag text property in the property container data structure, each of the text properties comprising at least a text attribute associated with a group of entities and a language attribute associated with the text attribute.

In an embodiment, each text property comprises a plurality of the same text attribute associated with a respective plurality of language attributes.

In an embodiment, the property container data structure comprises a first and second text properties, the first text property comprising a text attribute associated with a first language attribute, and the second text property comprising the text attribute associated with a second language attribute, the first language being different from the second language, and wherein the association data structure comprises association information between the first and second text properties, and the grouping data structure.

In an embodiment, the association data structure further comprises at least an association of a property with an entity.

According to another aspect of the invention, there is provided a method of reading media data in a file, wherein the method comprises:
- reading a grouping data structure describing a group of entities, each entity corresponding to at least a portion of media data;
- reading a text property in the grouping data structure comprising at least a text attribute associated with a group of entities and a language attribute associated with the text attribute; and
- reading the media data identified in the grouping data structure according to the property.

In an embodiment, the text property comprises a plurality of the same text attribute associated with a respective plurality of language attributes.

In an embodiment, the text property comprises a plurality of text attributes comprising a name text attribute, a description text attribute, and a tag text attribute.

According to another aspect of the invention, there is provided a device for encapsulating media data in a file, wherein the device comprises circuitry configured for:
- generating a grouping data structure describing a group of entities, each entity corresponding to at least a portion of media data;
- generating a property container data structure containing a property associated with a group of entities;
- generating an association data structure comprising association information between the property and the grouping data structure;
- generating a property data structure comprising the property container data structure and the association data structure; and
- embedding the grouping data structure, the property data structure, and the media data in the file.

According to another aspect of the invention, there is provided a device for encapsulating media data in a file, wherein the device comprises circuitry configured for:
- generating a grouping data structure describing a group of entities, each entity corresponding to at least a portion of media data;
- generating a text property in the grouping data structure comprising at least a text attribute associated with a group of entities and a language attribute associated with the text attribute; and
- embedding the media data, and the grouping data structure in the file.

According to another aspect of the invention, there is provided a device for reading media data in a file, wherein the device comprises circuitry configured for:
- reading a grouping data structure describing a group of entities, each entity corresponding to at least a portion of media data;
- reading a property container data structure containing a property associated with a group of entities;
- reading an association data structure comprising association information between the property and the grouping data structure;
- reading a property data structure comprising the property container data structure and the association data structure; and
- reading the media data identified in the grouping data structure according to the property.

According to another aspect of the invention, there is provided a device for reading media data in a file, wherein the device comprises circuitry configured for:
- reading a grouping data structure describing a group of entities, each entity corresponding to at least a portion of media data;
- reading a text property in the grouping data structure comprising at least a text attribute associated with a group of entities and a language attribute associated with the text attribute; and
- reading the media data identified in the grouping data structure according to the property.

According to another embodiment, there is provided a computer program product for a programmable apparatus, the computer program product comprising a sequence of instructions for implementing a method according to the invention, when loaded into and executed by the programmable apparatus.

According to another embodiment, there is provided a computer-readable storage medium storing instructions of a computer program for implementing a method according to the invention.

According to another embodiment, there is provided a computer program which upon execution causes the method of the invention to be performed.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which.

The HEVC standard defines a profile for the encoding of still images and describes specific tools for compressing single still images or bursts of still images. An extension of the ISO Base Media File Format (ISOBMFF) used for such kind of image data has been proposed for inclusion into the ISO/IEC 23008 standard, in Part 12, under the name: "HEIF or High Efficiency Image File Format".

The HEIF and MIAF standards cover two forms of storage corresponding to different use cases:
- the storage of image sequences, with timing that is optionally used at the decoder, and in which the images may be dependent on other images, and
- the storage of single images, and collections of independently coded images.

In the first case, the encapsulation is close to the encapsulation of the video tracks in the ISO Base Media File Format (see document «Information technology—Coding of audio-visual objects—Part 12: ISO base media file format», ISO/IEC 14496-12:2015, Fifth edition, December 2015), and the similar tools and concepts are used, such as the file-level 'moov' box, 'trak' boxes (encapsulated in the 'moov' box) and the sample grouping for description of samples and group of samples. A sample denotes all timed data associated with a single time (e.g. a frame in a video or an image in an image sequence).

Boxes, also called containers, are data structures provided to describe the data in the files. Boxes are object oriented building block defined by a unique type identifier (typically a four-character code, also noted FourCC or 4CC) and length. All data in a file (media data and metadata describing the media data) is contained in boxes. There is no other data within the file. File-level boxes are boxes that are not contained in other boxes.

The 'moov' box is a file format box that contains 'trak' sub boxes, each 'trak' box describing a track, that is to say, a timed sequence of related samples.

In the second case, a set of ISOBMFF boxes, the 'meta' boxes are used. These boxes and their hierarchy offer less description tools than the 'track related' boxes ('trak' box hierarchy) and relate to "information items" or "items" instead of related samples. It is to be noted that the wording 'box' and the wording 'container' may be both used with the same meaning to refer to data structures that contain metadata describing the organization or/and properties of the image data in the file. The same wording 'box' and the wording 'container' may also be both used with the same meaning to refer to metadata structures that contain the image data in the file (e.g. 'mdat' or 'idat' boxes).

Figure 1:
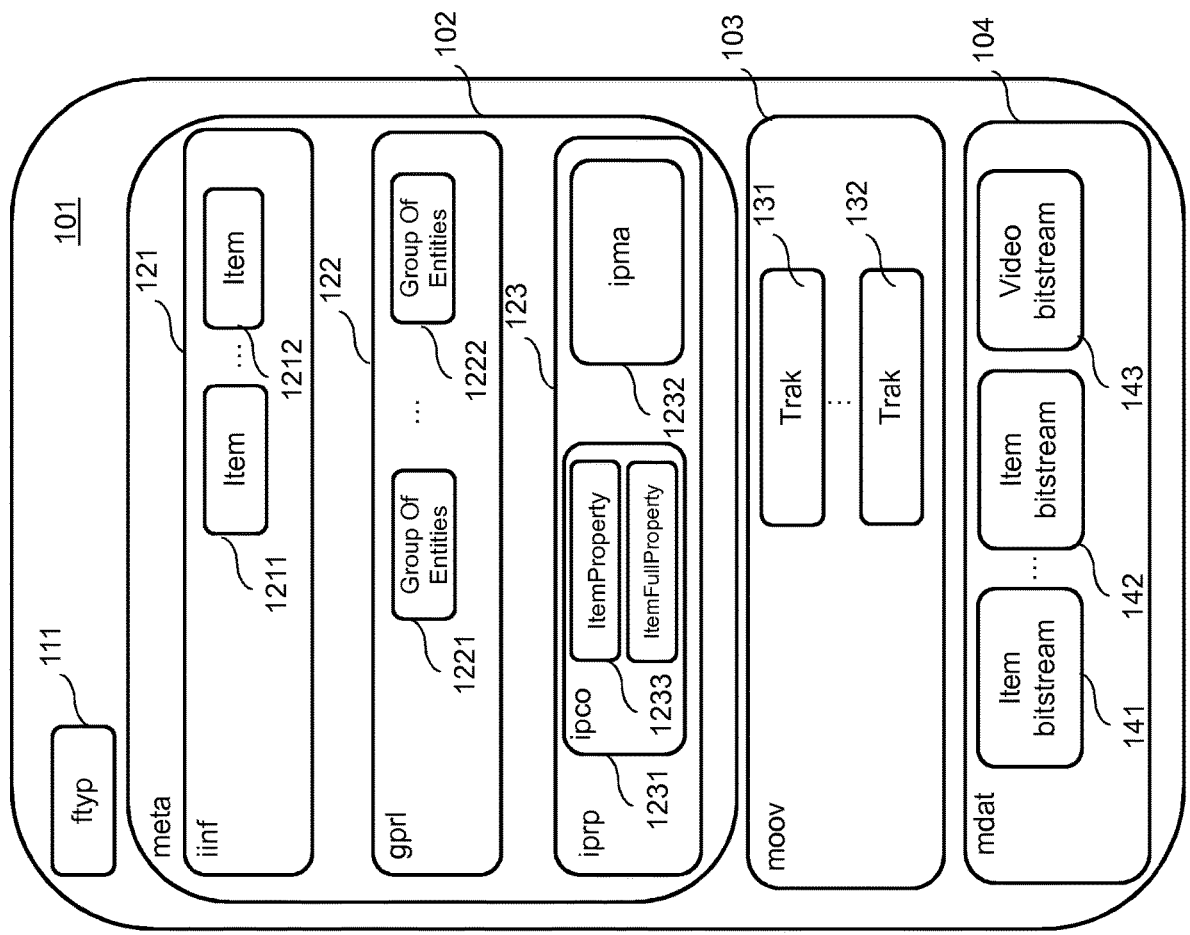
FIG. 1 illustrates an example of an HEIF file that contains several images or sequences of images.

FIG. 1 illustrates an example of an HEIF file 101 that contains media data like one or more still images and possibly video or sequence of images. This file contains a first 'ftyp' box (FileTypeBox) 111 that contains an identifier of the type of file, (typically a set of four character codes). This file contains a second box called 'meta' (MetaBox) 102 that is used to contain general untimed metadata including metadata structures describing the one or more still images. This 'meta' box 102 contains an 'iinf' box (ItemInfoBox) 121 that describes several single images. Each single image is described by a metadata structure ItemInfoEntry also denoted items 1211 and 1212. Each items has a unique 32-bit identifier item_ID. The media data corresponding to these items is stored in the container for media data, the 'mdat' box 104.

Optionally, for describing the storage of image sequences or video, the HEIF file 101 may contain a third box called 'moov' (MovieBox) 103 that describes several tracks 131 and 132. Typically, the track 131 is an image sequence ('pict') track designed to describe a set of images for which the temporal information is not necessarily meaningful and 122 is a video ('vide') track designed to describe video content. Both these tracks describe a series of image samples, an image sample being a set of pixels captured at the same time, for example a frame of a video sequence. Main difference between the two tracks is that in 'pict' tracks the timing information is not necessarily meaningful whereas for 'vide' track the timing information is intended to constraint the timing of the display of the samples. The data corresponding to these samples is stored in the container for media data, the 'mdat' box 104.

The 'mdat' container 104 stores the untimed encoded images corresponding to items as represented by the data portion 141 and 142 and the timed encoded images corresponding to samples as represented by the data portion 143.

The purpose of HEIF file 101 is to describe the different alternatives available to store multiple images in one HEIF file. For instance, we may store the multiple images either as items or as a track of samples that can be a 'pict' track or a 'vide' track. The actual choice is typically made by the application or device generating the file according to the type of images and the contemplated usage of the file.

The HEIF standard also provides some mechanisms designed to specify properties associated to images, in particular some metadata structures to declare or store properties for images and more generally for items (of any kind of media types). Typically, the 'meta' box 102 may contain an 'iprp' box (ItemPropertiesBox) 123 that enables the association of any item with an ordered set of item properties. This 'iprp' box 123 contains an 'ipco' box (ItemPropertyContainerBox) 1231 that is a property container data structure that contains all property data structures (ItemProperty and itemFullProperty) 1233 describing properties of all items described in the HEIF file. The 'iprp' box also contains a set of 'ipma' box (ItemPropertyAssociationBox), which are association data structures that actually associates one or more item properties with a given item. It is then possible to associate a same property with several items.

The associated syntax is as follow:

```
aligned(8) class ItemProperty(property_type)
   extends Box(property_type)
{
}
aligned(8) class ItemFullProperty(property_type, version, flags)
   extends FullBox(property_type, version, flags)
{
}
aligned(8) class ItemPropertyContainerBox
   extends Box('ipco')
{
   Box properties[ ];   // boxes derived from
      // ItemProperty or ItemFullProperty, to fill box
}
aligned(8) class ItemPropertyAssociationBox
   extends FullBox('ipma', version, flags)
{
unsigned int(32) entry_count;
   for(i = 0; i < entry_count; i++) {
      if (version < 1)
         unsigned int(16)   item_ID;
      else
         unsigned int(32)   item_ID;
      unsigned int(8) association_count;
      for (i = 0; i < association_count; i++) {
         bit(1) essential;
         if (flags & 1)
            unsigned int(15) property_index;
         else
            unsigned int(7) property_index;
      }
   }
}
aligned(8) class ItemPropertiesBox
   extends Box('iprp') {
   ItemPropertyContainerBox property_container;
   ItemPropertyAssociationBox association[ ];
}
```

The ItemProperty and ItemFullProperty boxes are designed for the description of a property, i.e. that all properties shall inherit from either ItemProperty or ItemFullProperty. Compared to ItemProperty, ItemFullProperty allows defining multiple versions of a property with varying syntax conditionally to the value of the version parameter and allows defining a map of flags to signal/activate optional features or parameters conditionally to the value of the flags parameter.

The ItemPropertyContainerBox is designed for describing a set of properties as an array of ItemProperty or ItemFullProperty boxes.

The ItemPropertyAssociationBox is designed to describe the association between items and their properties. It provides the description of a list of item identifiers, each item identifier (item_ID) being associated with a list of property index referring to a property in the ItemPropertyContainerBox (as a 1-based index value). The index value 0 is reserved to indicate that no property is associated with the item. The essential attribute when set to 1 indicates that the associated property is essential to the item, otherwise it is non-essential.

Finally, the ItemPropertyContainerBox and the ItemPropertyAssociationBox(es) are gathered within an ItemPropertiesBox.

ISO Base Media File Format specifies a grouping mechanism adapted for the grouping of items and/or tracks. In this mechanism, the wording 'entity' is used to refer to media data as items (any type of items, e.g. image or metadata items) or tracks (e.g. video track 'vide', sequence of images track 'pict', audio track, or any other type of tracks). This mechanism specifies the grouping of entities.

The 'meta' box 102 may contain a container box 'gprl' (GroupsListBox) 122 that may contains a set of metadata structures describing groups of entities 1221 and 1222.

A group of entities is described by a grouping data structure called EntityToGroupBox defined according to the following syntax:

```
aligned(8) class EntityToGroupBox(grouping_type, version, flags)
extends FullBox(grouping_type, version, flags) {
   unsigned int(32) group_id;
   unsigned int(32) num_entities_in_group;
   for(i=0; i<num_entities_in_group; i++)
      unsigned int(32) entity_id;
// the remaining data may be specified for a particular
grouping_type
}
```

The group_id is a unique identifier of the group of entities, unique in this case must be understood as unique within the file. It shall not be equal to any group_id value of any EntityToGroupBox, any item_ID value of the hierarchy level (file, movie. or track) that contains the GroupsListBox or any track_ID value (when the GroupsListBox is contained in the file level). Then, the list of entity_id gives all the entities pertaining to the group.

The grouping_type is used to specify the type of grouping. HEIF actually defines a limited number of grouping_type values. A first grouping_type 'altr' specifies that the different entities are alternatives that may alternatively be used in an application. A second grouping_type 'egiv' specifies that a given untimed image relate to a particular position in the timeline of a track. All the items included in an 'egiv' entity group are 'equivalent' and the tracks in the same 'egiv' entity group include selected samples that are 'equivalent' to the items. A third grouping_type 'ster' specifies that two entities are a stereo pair, typically left and right views, in a stereoscopic application. No other grouping type of entities is specified.

It is to be noted that this mechanism is very limited as there are only three types of groups specified. Moreover, nothing is specified to provide some further potential information or properties on the group or on the entities within the group.

The invention provides a mechanism that provides a mean for describing a group of images captured according to a given capture mode. It is provided a mean to describe the capture mode that has been used. According to some embodiments, some additional information regarding the capture may be described in relation with the group of images.

The invention can also be applied to other group of entities that can be encapsulated using the HEIF format. For example, it can be applied to groups of metadata such as groups of Exif data. As another example, it can be applied to groups of audio samples.

Figure 2:
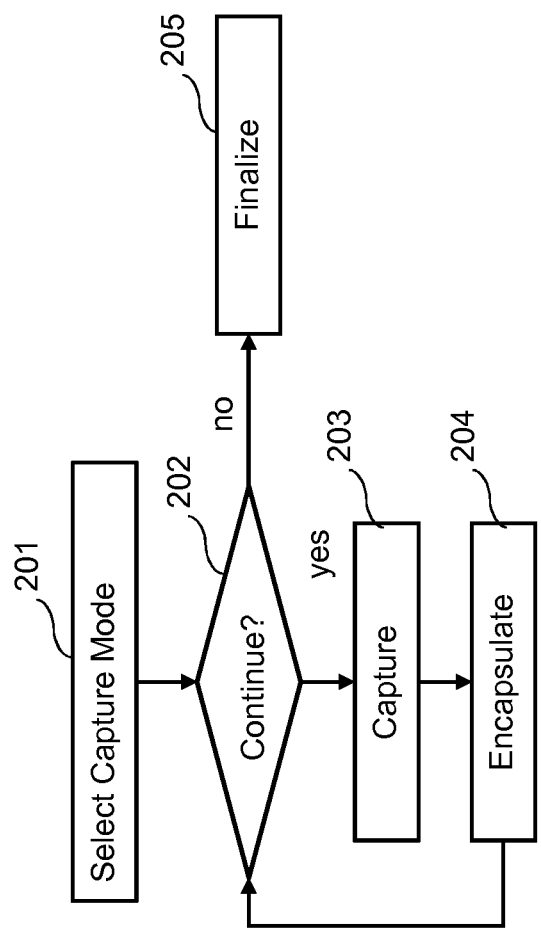
FIG. 2 illustrates the main steps of a process for encapsulating a series of images in one file using HEIF format.

FIG. 2 illustrates the main steps of a process for encapsulating a series of images in one file using HEIF format. A camera may for instance apply this processing. The given example applies to the grouping of images captured by a camera according to different capture modes.

First, the capture mode of the series of photo is determined in a step 201. The capture mode of the series of images describes the kind of relationship between the images of the series. For instance, the capture modes are one of the following:

Bracketing capture mode includes auto exposure, white balance, focus, flash bracketing modes. All these bracketing modes consist in performing several shots of the same content with different values of one or more parameters of the shooting. These different bracketing modes differ in the parameter whose value is varying in the series of capture. The capture system changes one capture parameter to generate the different versions. For example, in auto exposure bracketing the time of exposure is modified for each image capture.

Image burst is a capture mode consisting in capturing successively a series of images with a small interval of time between two image captures.

Panorama is a capture mode where several images are captured with an overlap between each capture. The principle is then to stitch each captured image to form a panorama of higher resolution.

Time-lapse is a capture mode consisting in capturing several images with the same device with a predetermined timing between each shot.

User collection, also called photo series, is a capture mode where a user associates images in a series that shares the same context. For instance, a photograph makes several photos of the same product and wants to store all the images he made in the same file. He starts the user collection capture mode at the beginning of the session. Once he finishes his shooting session, he stops the capture mode.

Super Resolution is a capture mode consisting in capturing several images at different resolutions that could be processed to generate a new image with a higher resolution.

Multi-Exposure is capture mode consisting in capturing several images at different exposures with the goal of generating a new image that is the superposition of the multi exposure set of images.

Noise Reduction is a capture mode consisting in capturing several images of a single scene to reduce the random noise generated by the capture process.

Long-exposure Noise Reduction is a capture mode for removing the sensor-related noise during long exposures. In this mode, in addition to the normal image(s), a image, called a 'dark', is captured with the same exposure duration without letting the light reach the sensor (for example by putting the cap on the lens, or by not opening the shutter). This 'dark' can be used to remove the sensor-related noise from the normal image.

Vignetting Compensation is a capture mode for compensating for the vignetting of the lens. Many lenses have a non-uniform response to light (typically, the corners of the images are darker than the center, due to less light coming through the lens in the corners than in the centre). To compensate for this non-uniformity, a reference image, called a 'flat' is captured, by taking an image of a uniformly lighted surface. This reference image can be used to compensate for the non-uniformity of other images capture with the same lens.

HDR (High Dynamic Range) is a capture mode for handling very large differences of luminosity in the capture scene. The resulting image is a combination of several images with different exposures. It is similar to the auto-exposure bracketing mode, but in a more general way: the exposure variation between the images may not be regular, or may be unspecified.

Once a capture mode has been selected in step 201, the processing loop composed of steps 202, 203, and 204 is applied. Until the end of the capture mode (for example by activating a specific options or buttons in the graphical or physical user interface of the device), the capturing device first captures an image in a step 203 and then encapsulates the encoded image in file format in a step 204. The capture step 203 includes the acquisition of the image and the encoding of the image in using a video or still picture codec. For instance, in this example, the codec is H.264 or HEVC/H.265 format.

For the storage of images, two main alternative possibilities are available.

In the first alternative, images are encoded independently and stored in the file as HEIF items. During this encapsulation step, additional information on the condition of capture may be provided in the file. For example, for auto exposure bracketing mode, the exposure data used for the capture of each image may be provided. This description is provided using properties in an ItemProperty box.

In a second alternative, images are stored in a 'pict' or 'vide' track. Additional information may be provided using SampleEntry or SampleGroupEntry boxes. The encoding of images may depend on previous images using an HEVC encoder similarly to video encoding. Previous images in the track are available as reference image for predictive encoding.

In a step 205, the encapsulation of the series of images is finalized. During this step, the storage of the captured images as a group of images is signalled in the file using one of the available grouping mechanism previously described. The type of the capture mode may be signalled in the grouping mechanism or alternatively in additional information stored for each image during step 204.

In order to be able to perform the storage of images as described in FIG. 2, new types of grouping are necessary along with new methods to signal these types of grouping in a file with associated properties.

In an embodiment, two or more capture mode are used at once. For example, for an astronomy photography both the long-exposure noise reduction and the vignetting compensation are used at once.

In another embodiment, the capture mode generates two or more grouping from the series of images. For example, in a time-lapse, a first grouping contains all the images, while a second grouping contains every other image.

In another embodiment, following step 205, a capture edition step is realized. During this capture edition step, a new group of images is created. This capture edition step can be realized several times, resulting in the addition of several groups of images.

A first possibility is to add a new grouping corresponding to the same capture mode as the initial capture mode. For example, at capture-time, a time-lapse is realized containing an image every second. The time-lapse images are grouped together at the end of the capture. At capture edition time, a second grouping is created, corresponding to another time-lapse with an image every other second.

Another possibility is to add a new grouping corresponding to another capture mode. For example, at capture-time an auto-exposure bracketing grouping is created. Then at capture edition time, an HDR grouping containing a subset of the auto-exposure bracketing grouping is created. This HDR grouping is the result of selecting some images of the auto-exposure bracketing grouping for generating an HDR image.

One Grouping Type Per Capture Mode.

According to a first embodiment, a grouping type is defined for each capture mode. This grouping type is described within the grouping information.

Figure 4:
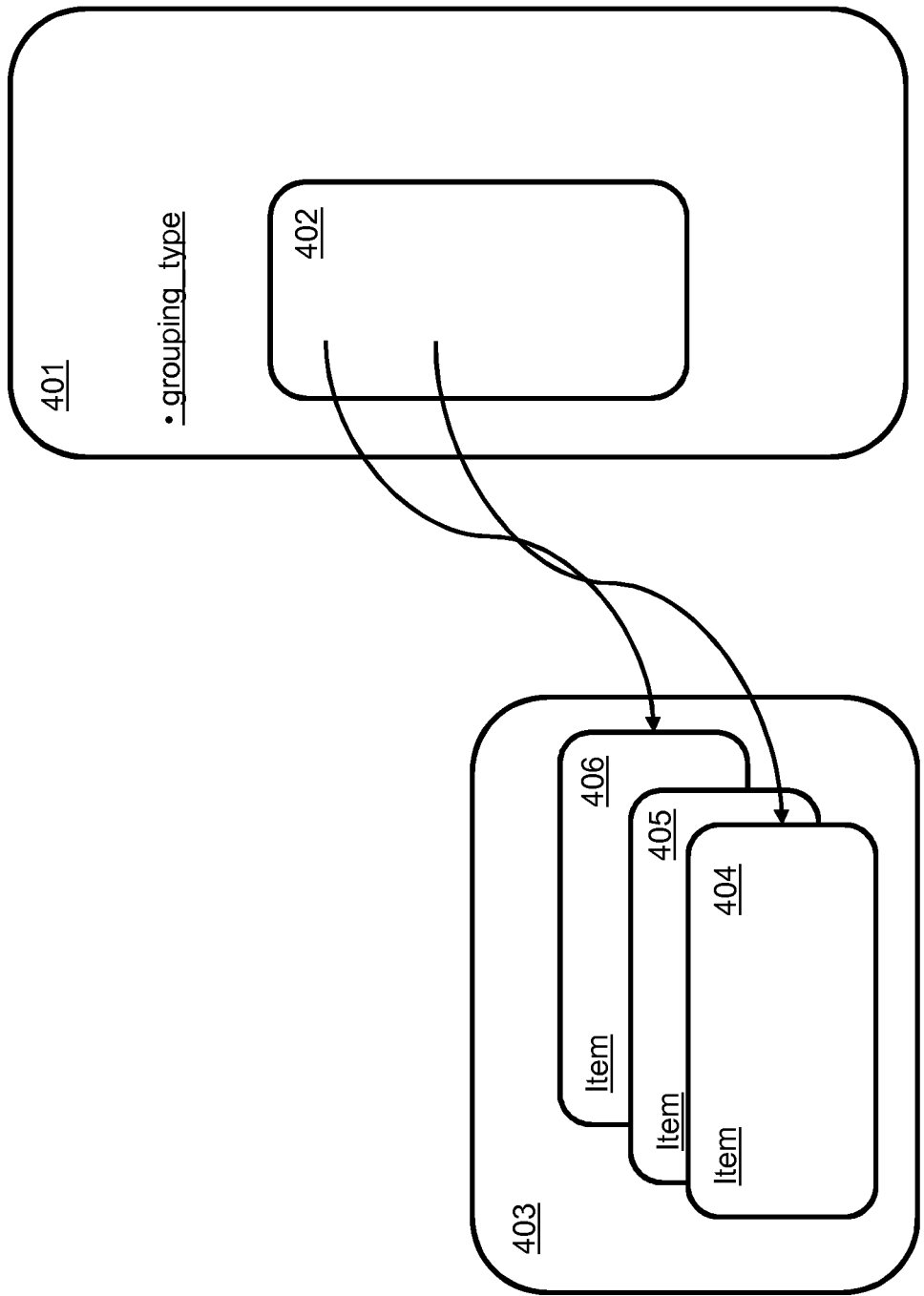
FIG. 4 illustrates an example according to a first embodiment of the invention including a grouping data structure.

FIG. 4 illustrates an example according to this first embodiment.

Images are described as items 404, 405 and 406 in an ItemInfoBox 403.

A grouping information box, for example an EntityToGroupBox 401 comprises the grouping type based on the capture mode. Then the grouping information box 401 comprises a list 402 of item identifiers of the item pertaining to the group.

For example, a generic 'brak' grouping type may be defined for bracketing capture mode (the 'brak' code here is an example). The particular type of bracketing mode, namely auto exposure bracketing, white balance bracketing, focus bracketing, flash exposure bracketing, depth of field bracketing and iso bracketing, may be signalled using a parameter of the 'brak' grouping type. For instance, with grouping of entities mechanism, the EntityToGroup contains a bracketing_type parameter which determines the type of the bracketing. Typically, the bracketing_type parameter is a reserved four-character code. One value of four-character code is predetermined for each bracketing type. In another example, sample grouping mechanism is used and the parameter of the 'brak' grouping type is described in a specific kind of (inheriting from) VisualSampleGroupEntry.

Alternatively, a specific grouping type may be defined for each particular bracketing capture mode: 'aebr' for auto exposure bracketing, 'wbbr' for white balance bracketing, 'fobr' for focus bracketing, 'afbr' for flash exposure bracketing, 'dobr' for depth of field bracketing and 'isbr' for iso bracketing.

A 'tila' grouping type may be defined for the time lapse capture mode. This type of grouping covers all the usages where several photos are taken, and where time is important. The main usage is for time lapse, with or without regular interval between photos. The parameters of the time lapse (e.g. the total duration of the time laps, the offset between each images) may be signaled using a parameter of the grouping (e.g.: as EntityToGroup or VisualSampleGroupEntry parameter).

A 'pano' grouping type may be defined for panorama grouping type. This includes all the usages where several photos are taken, and where the spatial dimension is important. This includes panoramas, but also different views of a given item. The parameters of the panorama (e.g. the capture pattern for instance from left to right, right to left, z-scan or spiral scan) may be signaled using a parameter of the grouping (e.g.: as EntityToGroup or VisualSampleGroupEntry parameter).

An 'imbu' or 'brst' grouping type may be defined for image burst grouping type. This covers all the cases when several images are captured successively without interruption. The parameters of the image burst (e.g. the time offset between each capture and the total duration of the capture) may be signaled using a parameter of the grouping (e.g.: as EntityToGroup or VisualSampleGroupEntry parameter).

An 'ucol', 'pser', 'labl' or 'udcs' grouping type may be defined for user collection or photo series or a set of photos with the same tag(s) or label(s) or user defined capture series capture mode. An automatic process may for instance groups the photo shot in the same location or/and within a predetermined interval of time. For instance, the capture device uses the location information (for instance from a GPS sensor) of the capture image to determine the name of the town corresponding to the location. All the images taken in the same town form one group of images. The parameters of the user collection (e.g. the location of the capture or a description of the content) may be signaled using a parameter of the grouping (e.g.: as EntityToGroup or VisualSampleGroupEntry parameter).

A 'sres' grouping type may be defined for the Super Resolution capture mode. This covers all the cases when several images are captured successively with the intent of generating a new image with a higher resolution. The parameters of the super resolution group (e.g. the intended resolution of the new image) may be signaled using a parameter of the grouping (e.g.: as an EntityToGroup or a VisualSampleGroupEntry parameter).

A 'mult' grouping type may be defined for the Multi Exposure capture mode. This covers all the cases when several images are captured successively with the intent of generating a new image formed by the superposition of the images in the group. The parameters of the multi exposure (e.g. the parameters for blending the set of images, which may indicate an alpha blending coefficient for each image of the group) may be signaled using a parameter of the grouping (e.g.: as an EntityToGroup or a VisualSampleGroupEntry parameter).

A 'nois' grouping type may be defined for the Noise Reduction capture mode. This covers all the cases when several images are captured successively with the intent of generating a new image with less noise.

A 'dark' grouping type may be defined for the Long-Exposure Noise Reduction capture mode. This covers all the cases when one or more images are captured alongside one or more 'dark' images (i.e. images captured without letting the light reach the sensor). The parameters of the long-exposure noise reduction (e.g. which images correspond to dark images) may be signaled using a parameter of the grouping (e.g.: as an EntityToGroup or a VisualSampleGroupEntry parameter).

A 'flat' grouping type may be defined for the Vignetting Compensation capture mode. This covers all the cases when one or more images are captured alongside one or more 'flat' images (i.e. images captured on an uniformly lit scene). The parameters of the vignetting compensation (e.g. which images correspond to flat images) may be signaled using a parameter of the grouping (e.g.: as an EntityToGroup or a VisualSampleGroupEntry parameter).

A 'hdr' grouping type may be defined for the HDR capture mode. This covers all the cases when one or more images are captured to generate an HDR image. The parameters of the HDR capture mode (e.g. the ordering of the images from the one corresponding to the most lighted areas to the one corresponding to the darkest areas) may be singled using a parameter of the grouping (e.g.: as an EntityToGroup or a VisualSampleGroupEntry parameter).

Other grouping types may be defined by combining two or more of these grouping types. For example, for astronomy images, an 'astr' grouping type may be defined combining both a Long-Exposure Noise Reduction and a Vignetting Compensation.

For example, a photograph makes two photos using AE bracketing. It results in 3×2 samples. Each photo is embedded in one image item.

The HEIF File thus contains six items as described below:
Item #1: Item_Id=1; //captured with short exposure time e.g. exposure_stop=−2
Item #2: Item_Id=2; //captured with medium exposure time e.g. exposure_stop=0
Item #3: Item_Id=3; //captured with long exposure time e.g.
exposure_stop=2
Item #4: Item_Id=4; //captured with short exposure time e.g. exposure_stop=−2
Item #5: Item_Id=5; //captured with medium exposure time e.g. exposure_stop=0
Item #6: Item_Id=6; //captured with long exposure time e.g. exposure_stop=2

An EntityToGroupBox with 'aebr' grouping type value is defined. There are two entries (one for each AE series of three samples):

```
GoupsListBox{
    EntityToGroupBox( 'aebr' ) {
        group_id='1234' // Identifier of the first bracketing set
        num_entities_in_group=3 // bracketing set size equal to 3
        entity_id=1 // refer the 1st item
        entity_id=2 // refer the 2nd item
        entity_id=3 // refer the 3rd item
    }
    EntityToGroupBox( 'aebr' ) {
        group_id='1235' // Identifier of the second bracketing set
        num_entities_in_group=3 // bracketing set size equal to 3
        entity_id=4 // refer the 1st item of the 2nd set i.e. 4th item
        entity_id=5 // refer the 1st item of the 3rd set i.e. 5th item
        entity_id=6 // refer the 1st item of the 4th set i.e. 6th item
    }
}
```

Generic Capture Series Grouping Type.

In a second embodiment, a generic grouping type 'case' for "capture series" is defined (the four character code 'case' being one example, any reserved non already used four character code might be used). This grouping type is intended to be used for all the capture modes previously described. When the images of the series are described as items, the Grouping Information is an EntityToGroup information box with a grouping_type parameter equal to 'case'. When, the images of the series are described as samples in a track (either 'vide' or 'pict' tracks), the Grouping Information is for instance a SampleToGroup and SampleGroupDescriptionBox information box with a grouping_type equal to 'case'.

When the HEIF contains several images with different capture modes, they all belong to the same 'case' group. When a series of items or samples belongs to a capture series group, the encapsulation shall specify the 'case' grouping type. To distinguish between the different capture, the type of the capture mode may be signalled in the Property Information. For instance, SampleEntry, SampleGroupDescriptionEntry, ItemProperty or ItemFullProperty may be used to precise the capture mode or/and parameter related to the series for some items of the group.

For example, the images being stored as items, an ItemPropertyContainerBox contains a set of ItemProperty boxes that describe the capture mode for a series of images. For example, one property describes an auto exposure bracketing capture mode, while another property describes the actual exposure value used for the capture.

In another embodiment, the Property Information is specified as a VisualSampleEntry information. In this embodiment, a SampleToChunkBox 'stsc' is present in the moov/trak/stbl box hierarchy of the multi-image file recorded on the camera. A chunk is a contiguous set of samples. The SampleToChunkBox::sample_description_index provides the index in the 'stsd' box of the SampleEntry applying to the samples of this chunk. A specific visual sample entry is defined containing an extra box compared to usual visual sample entries (for example of type 'hvc1' or 'avc1' as in ISO/IEC 14496-15). This extra box provides the parameters for the grouping type, for example description of the bracketing mode, or a tag or label provided by the user (or any specific property as suggested by the non-limitative list of this invention).

In yet another embodiment, a grouping of images combine two or more capture modes. In this embodiment, the grouping is specified using a 'case' grouping_type. Then, each capture mode is specified using its own Property Information.

Regarding the auto exposure bracketing capture mode, in a first embodiment, the value of the exposure is described in property information as an ItemProperty or a VisualSampleEntry as follows:

1. Syntax for Item Property
aligned(8) class AutoExposureBracketingProperty extends ItemProperty( 'aebr' ) {
    int (8) exposure_stop;
}
2. Syntax for Sample Entry
Box type: 'aebr'
Container: VisualSampleEntry
Mandatory: No
Quantity: Zero or one
aligned(8) class AutoExposureBracketing extends Box ( 'aebr' ) {
    int (8) exposure_stop;
}
3. Syntax for Sample Group Entry
aligned(8) class AutoExposureBracketingEntry extends VisualSampleGroupEntry( 'aebr' ) {
    int (8) exposure_stop
}
4. Semantic
exposure_stop is an integer value specifying the EV stop of the item.

According to another embodiment, the exposure value of each image is computed from the information specified in the property information, typically an ItemProperty. For instance, the syntax may be:

```
aligned(8) class AutoExposureBracketingProperty extends
ItemProperty( 'aebr' ) {
    int (8) exposure_step; /*full=1, half=2, third=3,
quarter=4*/
    int (8) exposure_stop;
}
``` where exposure_step is an integer value that specifies the increment steps used for the exposure bracketing. For example, when equal to 1, full stop increment is used, when equal to 2, half stop increment is used, when equal to 3, third stop increment is used, and when equal to 4, a quarter stop increment is used. The exposure_stop parameter is the maximum stop value.

As a result, the first image in the order of declaration in the Grouping Information is the one with the lowest exposure time. The number of images in the Grouping Information is odd. The exposure stop of this image is equal to the result of the formula: −1*exposure_stop/exposure_step.

The last image has an exposure stop equal to exposure_stop/exposure_step. The image with index equal to the number of images in the group divided by two (i.e. the image at the middle position) has an exposure_stop equal to 0. When the number of images is greater than three, the exposure_stop interval [−exposure_stop/exposure_step, exposure_stop/exposure_step] is equally distributed among all the images described in the group.

According to yet another embodiment, the order of the images in the bracketing set (the order of description in the Grouping Information i.e. in the EntityToGroup or in the SampleToGroup boxes) is different than the natural order (ascending order). The Property Information includes a new parameter that describes the order of the bracketing set. The syntax may be as follows:

```
aligned(8) class AutoExposureBracketingProperty extends
ItemProperty( 'aebr' ) {
    int (8) exposure_order;
    int (8) exposure_step;
    int (8) exposure_stop;
}
```

The new exposure_order parameter specifies the order of the image in the bracketing set:

equal to 0, the ordering is by ascending order of exposure_stop in the exposure_stop interval. For example, the order is {−2EV, 0EV, 2EV} equal to 1, the ordering is by descending order of exposure_stop in the exposure_stop interval. For example, the order is {2EV, 0EV, 2EV} equal to 2, the ordering start first by the image of exposure_stop equal to 0EV, followed by the other images in ascending order. For example, the order is {0EV, −2EV, 2EV} equal to 3, the ordering start first by the image of exposure_stop equal to 0EV, followed by the other images in descending order. For example, the order is {0EV, 2EV, −2EV}

For White Balance Bracketing the Property Information signals the color temperature of the image in either an ItemProperty, an ItemFullProperty or a SampleEntry or a SampleGroupEntry. The syntax may be as follows:

```
1. Syntax for Item Entry
aligned(8) class WhiteBalanceBracketingProperty
extends ItemProperty( 'wbbr' ) {
    unsigned int (16) color_temperature
}
2. Syntax for Sample Entry
Box type: 'wbbr'
Container: VisualSampleEntry
Mandatory: No
Quantity: Zero or one
aligned(8) class WhiteBalanceBracketingEntry extends Box
( 'wbbr' ) {
    unsigned int (32) color_temperature
}
3. Syntax for Sample Group Entry
aligned(8) class WhiteBalanceBracketing extends
VisualSampleGroupEntry( 'wbbr' ) {
    unsigned int (32) color_temperature
}
4. Semantic
    - color_temperature represents the color temperature value, for
example
in Kelvin. In another alternative, the color temperature is computed from
the color_temperature. For instance, each value of the parameter
corresponds to a predetermined color temperature. For instance, the color
temperature in Kelvin is equal to color_temperature*10+2200.
```

In an alternative embodiment, the White Balance Bracketing Property Information (wbbr) indicates the white balance compensation on the Blue/Amber axis and/or on the Magenta/Green axis applied to the associated image compared to the initial camera settings.

The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
1. Syntax for ItemProperty
aligned(8) class FocusBracketingItemProperty
extends ItemProperty( 'fobr' ) {
    int(8) blue_amber;
    int(8) green_magenta;
}
2. Semantic
    - blue_amber is the value of the white balance compensation on the
blue-amber axis. This blue_amber field represents the 'color temperature'.
    - green_magenta is the value of the white balance compensation
on the green-magenta axis. The green_magenta field represents the 'tint'.
```

It should exist one and only one entity group 'wbbr' referencing the associated image item. When the Property Information is a SampleGroupEntry, there may be several sample groups of type 'wbbr', each with a different value of grouping_type_parameter.

For Focus Bracketing the Property Information signals the focus distance used when capturing the image in either an ItemProperty, an ItemFullProperty or a SampleEntry or a SampleGroupEntry. The syntax may be as follows:

```
1. Syntax for ItemProperty
aligned(8) class FocusBracketingItemProperty
extends ItemProperty( 'fobr' ) {
    usigned int (32) focus_distance_numerator
    usigned int (32) focus_distance_denominator
}
```

-continued

```
2. Syntax for Sample Entry
Box type: 'fobr'
Container: VisualSampleEntry
Mandatory: No
Quantity: Zero or one
aligned(8) class FocusBracketing extends Box ( 'fobr' ) {
    usigned int (32) focus_distance_numerator
    usigned int (32) focus_distance_denominator
}
3. Semantic
```

The focus distance is expressed for instance in meter as the ratio between focus_distance_numerator and focus_distance_denominator fields. In another embodiment, these two parameters are replaced by a focus_distance parameter which expresses the distance in millimeters.

For Image burst capture mode, the Property Information signals the index of the capture in either ItemProperty, ItemFullProperty or SampleEntry or SampleGroupEntry boxes. Below is a possible syntax of the Property Information as an Item Property. The syntax of the box for VisualSampleEntry and SampleGroupEntry contains the same parameters and defines the same four character codes. The difference is that, for VisualSampleEntry, the new class extends the Box class and shall be defined in one VisualSampleEntry container. For SampleGroupEntry, the new class extends the VisualSampleGroupEntry box with same four character coded as defined for the Item Property.

In a first embodiment the syntax may be:

```
aligned(8) class ImageBurstProperty
extends ItemProperty( 'imbu' ) {
    unsigned int (32) burst_index
}
``` with the semantic:
burst_index represents the index of the item in the burst of images.

In a second embodiment, the index of the images in the burst is inferred from the order of declaration of the items. This reduces the number of properties to describe and thus the HEIF file is more compact. Below is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class ImageBurstProperty
extends ItemProperty( 'imbu' ) {
    unsigned int (1) infer_index_value;
    if (infer_index_value == 0)
        unsigned int (32) burst_index
}
``` with the following semantics:
infer_index_value is a boolean value which indicates that the index of the item in the burst of image is equal to the position index of the item in the 'iinf' box.
burst_index represents the index of the item in the burst of images.

In another embodiment, the infer_index_value indicates that the index of the item in the burst of images is equal to the index of the item in the Grouping Information. This embodiment advantageously permits to define several orderings (e.g. a normal and reverse order) by defining two groups.

In another embodiment, the ImageBurst Property Information includes the timing interval between two images of the burst as an unsigned integer value expressed in milliseconds.

The syntax may be:

```
aligned(8) class ImageBurstProperty
extends ItemProperty( 'imbu' ) {
    unsigned int(32) time_delta;
}
```

With the following semantics:
time_delta is the number of hundredth of seconds elapsed between the image item and the previous one in the burst.
This property should be absent or ignored for the first image item in an entity group of type 'brst'.

In yet another embodiment, the ImageBurst Property Information defines the capture time of the associated image in a burst of images. Preferably, the time zero correspond to a reference time defined by the capturing device. This allows several Image Bursts to use the same reference time, allowing to define several Image Bursts to contain the same image item. The syntax may be:

```
aligned(8) class ImageBurstProperty
extends ItemProperty( 'imbu' ) {
    unsigned int(32) capture_time;
}
``` with the following semantics:
capture_time is the number of hundredth of seconds elapsed between the image item and a reference time from the capturing device.

In yet another embodiment, the ImageBurst Property Information defines which burst of images the property applies to. This enables an image item to belong to several burst with different interval between the images. For example, a first burst can contain images captured every second, while a second burst contains only the images captured every other second.

The syntax may be:

```
aligned(8) class ImageBurstProperty
extends ItemProperty( 'imbu' ) {
    unsigned int(32) time_delta;
    unsigned int(32) group_id;
}
```

With the following semantics:
time_delta is the number of hundredth of seconds elapsed between the image item and the previous one in the burst.
group_id is the identifier of the targeted EntityToGroup.
This property should be absent or ignored for the first image item in an entity group of type 'brst'.

In other embodiments, the Property Information for the Image burst capture mode uses the 'brst' four character code.

For Time Lapse capture modes, the Property Information signals the interval between the capture of successive images, or the capture time of an image. This property information can use the 'tila' four character code. It can have the same syntax and semantics as the ImageBurstProperty where a time-related parameter is used.

The Photo Series or User Collection or Property Information signals the index of the captured image in the set in either ItemProperty, ItemFullProperty or SampleEntry or SampleGroupEntry boxes. Below is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class PhotoSeriesProperty
extends ItemProperty('pser') {
    unsigned int (32) series_index
}
``` with the following semantics:
series_index represents the index of the item in the burst of images.

In another embodiment, the index of the photo series is inferred as done for Image Burst Property Information, thus saving description bytes.

The Flash Exposure Bracketing Information signals the flash exposure value of the captured image in either ItemProperty, ItemFullProperty or SampleEntry or SampleGroupEntry boxes. Below is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class FlashExposureBracketingProperty
extends ItemProperty('afbr') {
    int (8) flash_exposure_numerator;
    int (8) flash_exposure_denominator;
}
``` with the following semantics:
flash_exposure_numerator and flash_exposure_denominator are integers representing the flash exposure value of the item or sample expressed in a number of f-stops as the ratio of flash_exposure_numerator and flash_exposure_denominator.

The Depth of Field Bracketing Information signals the aperture change value of the captured image in either ItemProperty, ItemFullProperty or SampleEntry or SampleGroupEntry boxes. Below is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class DepthOfFieldBracketingProperty
extends ItemProperty( 'dobr' ) {
    int (8) f_stop_numerator;
    int (8) f_stop_denominator;
}
``` with the following semantics:
where the aperture change is expressed in a number of f-stops as the ratio of f_stop_numerator and f_stop_denominator which are integer values.

The Panorama Information signals that the image belongs to a group of images captured using a Panorama capture mode. This information is in either an ItemProperty, an ItemFullProperty, a SampleEntry, or a SampleGroupEntry. Below is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class PanoramaBracketingProperty
extends ItemProperty('pano') {
    unsigned int (1) panorama_direction;
    unsigned int(15) frame_number;
}
``` with the following semantics:
panorama_direction is a 1-bit flag signaling the panorama direction (0: left-to-right, 1: right-to-left) and frame_number is an integer representing the frame number according to the panorama direction (lower to higher).

In another embodiment, the syntax may be:

```
aligned(8) class PanoramaBracketingProperty
extends ItemProperty('pano') {
    unsigned int (1) panorama_direction;
    unsigned int (7) reserved;
}
``` with the following semantics:
panorama_direction is a 1-bit flag signaling the panorama direction (0: left-to-right, 1: right-to-left). The frames are ordered according to the default group ordering.

In yet another embodiment, the syntax may be:

```
aligned(8) class PanoramaBracketingProperty
extends ItemProperty('pano') {
    unsigned int (8) panorama_type;
    if (panorama_type == 4) {
        unsigned int (8) rows;
        unsigned int (8) columns;
    }
    if (panorama_type == 5) {
        unsigned int (8) rows;
```

```
            for (i = 0; i < rows; i++) {
                unsigned int (8) columns;
            }
        }
        if (panorama_type == 8) {
            unsigned int(32) panorama_subtype;
        }
    }
``` with the following semantics:

panorama_type is an unsigned integer, for example on 8 bits, signaling the type of panorama used:
- 0: left-to-right horizontal panorama
- 1: right-to-left horizontal panorama
- 2: top-to-bottom vertical panorama
- 3: bottom-to-top vertical panorama
- 4: grid panorama, which has two additional parameters:
  - rows is the number of rows in the grid
  - columns: is the number of columns in the grid. Possibly this parameter may not exist and the number of columns is computed from the total number of images in the group and the number of rows.
- 5: irregular grid panorama, which has several other parameters:
  - rows is the number of rows in the grid
  - columns: is the number of columns for each row in the grid.
- 6: cubic panorama, with the images ordered according to the front, left, back, right, top, bottom order. Possibly other ordering, or other types of cubic panorama with different ordering could be defined.
- 7: unspecified panorama, where the exact type of the panorama is not specified.
- 8: user-defined panorama, which has another parameter, panorama_subtype, which is a 4CC identifying the type of panorama.

For horizontal and vertical panorama, a flag can be added to indicate whether the panorama is a full 360° panorama, where the last image is merged with the first image.

For grid panorama (regular or not), flags could be added in the same way, to indicate whether the panorama covers 360° horizontally, vertically, or in both directions.

The Super Resolution information signals that the image belongs to a group of images captured using a Super Resolution capture mode. This information is in either an ItemProperty, an ItemFullProperty, a SampleEntry, or a SampleGroupEntry. Hereafter is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class SuperResolutionProperty
    extends ItemProperty('sres') {
}
```

The Multi Exposure information signals that the image belongs to a group of images captured using a Multi Exposure capture mode. This information is in either an ItemProperty, an ItemFullProperty, a SampleEntry, or a SampleGroupEntry. Hereafter is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class MultiExposureProperty
    extends ItemProperty('mult') {
        unsigned int (8) weight;
}
``` with the following semantics:

weight indicates the alpha blending coefficient for this image.

The Noise Reduction information signals that the image belongs to a group of images captured using a Noise Reduction capture mode. This information is in either an ItemProperty, an ItemFullProperty, a SampleEntry, or a SampleGroupEntry. Hereafter is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class NoiseReductionProperty
    extends ItemProperty('nois') {
}
```

The Long-Exposure Noise Reduction Information signals that an image correspond to a dark in either an ItemProperty, an ItemFullProperty, a SampleEntry, or a SampleGroupEntry. Hereafter is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class LongExposureNoiseReductionProperty
    extends ItemProperty('dark') {
}
``` with the following semantics:

an item with the LongExposureNoiseReductionProperty correspond to a 'dark' image.

The Vignetting Compensation Information signals that an image correspond to a flat in either an ItemProperty, an ItemFullProperty, a SampleEntry, or a SampleGroupEntry. Hereafter is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class VignettingCompensationProperty
    extends ItemProperty('flat') {
}
``` with the following semantics:

an item with the VignettingCompensationProperty correspond to a 'flat' image.

The HDR Information signals the ordering of an image in either an Item Property, an ItemFullProperty, a SampleEntry, or a SampleGroupEntry. Hereafter is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class HDRProperty
    extends ItemProperty('hdr ') {
        unsigned int(8) item_order;
}
``` with the following semantics:

item_order is the ordering of the item inside its group.

As an alternative, the HDR information signals only that the image belongs to a group of images captured using an HDR capture mode. This information is in either an ItemProperty, an ItemFullProperty, a SampleEntry, or a SampleGroupEntry. Hereafter is the syntax of the Property Information as an Item Property. The syntax of the box for VisualSampleEntry and SampleGroupEntry contains the same parameters and defines the same four character codes. The difference is that for VisualSampleEntry, the new class extends the Box class and shall be defined in one VisualSampleEntry container. For SampleGroupEntry, the new class extends the VisualSampleGroupEntry box with same four character codes as defined for the Item Property.

The syntax may be:

```
aligned(8) class HDRProperty
    extends ItemProperty('hdr ') {
}
```

For all these properties, when applicable, the parameter values can either be absolute or relative. An absolute value means that the reference is external to the grouping. A relative value means that the value is specified as a difference with the value for another item of the grouping. By default the reference item used for relative values if the first one in the grouping. In some cases, the reference item the reference item can be the previous one in the grouping. For example, the capture time in a time lapse is either an absolute time, corresponding to a pre-defined reference time, or it is a relative time where only the time difference with the previous image is given.

Preferably, for bracketing the capture settings are specified as relative to the camera settings. This enables several grouping using the same bracketing mode to share the same reference for the values from the Property Information. In this way, an item that belongs to several grouping using the same capture mode has only one Property Information corresponding to this capture mode attached to it.

In an embodiment, when using relative values, the Property Information contains the identifier of the group. This enables an item to belong to several grouping using the same capture mode, as the Property Information for each group is linked to its group by the identifier it contains.

In this embodiment, the Property Information for the auto exposure bracketing mode may be:

```
aligned(8) class AutoExposureBracketingProperty
    extends ItemProperty('aebr') {
        int (8) exposure_stop;
        unsigned int(32) group_id;
}
``` where group_id is the identifier of the group owning the item associated to this property and for which the property applies.

Concerning SampleToGroup, by default a sample can only be associated to a single group. However, using the grouping_type_parameter of the SampleToGroup box, several groups can be defined for the same sample. Therefore, in a preferred embodiment, when grouping samples according to one of the grouping types defined in the invention, the grouping_type_parameter field may be used to enable grouping of a single sample into several groups.

In the following example, two different captures have been done using auto exposure bracketing capture mode. Each capture results in capturing three different images. The two captures result in six images. Each image being embedded in one item.

The file structure would be:
Item #1: ItemId=1; exposure_stop=−2//exposure=low
Item #2: ItemId=2; exposure_stop=0//exposure=mid
Item #3: ItemId=3; exposure_stop=2//exposure=high
Item #4: ItemId=4; exposure_stop=−1//exposure=low
Item #5: ItemId=5; exposure_stop=0//exposure=mid
Item #6: ItemId=6; exposure_stop=−1//exposure=high An EntityToGroupBox with 'case' grouping type value is defined. There are two entries (one for each AE series of 3 samples):

```
GoupsListBox{
    EntityToGroupBox('case') {
        group_id='1234' // 1st bracketing set
        num_entities_in_group=3
        entity_id=1 // Refer to item #1
        entity_id=2 // Refer to item #2
        entity_id=3// Refer to item #3
    }
    EntityToGroupBox('case') {
        group_id='1235' // 2nd bracketing set
        num_entities_in_group=3
        entity_id=4 // Refer to item #4
        entity_id=5// Refer to item #5
        entity_id=6// Refer to item #6
    }
}
```

```
ItemPropertyContainerBox {
    // List all the bracketing properties used by all the items
    AutoExposureBracketingProperty('aebr') { // property_index=1
        exposure_stop = -2
    }
    AutoExposureBracketingProperty('aebr') { // property_index=2
        exposure_stop = -1
    }
    AutoExposureBracketingProperty('aebr') { // property_index=3
        exposure_stop = 0
    }
    AutoExposureBracketingProperty('aebr') { // property_index=4
        exposure_stop = 1
    }
    AutoExposureBracketingProperty('aebr') { // property_index=5
        exposure_stop = 2
    }
}
ItemPropertyAssociation{
    // Associate each item with properties describing the exposure
    entry_count = 6 // 6 items
    // Item #1
    item_id = 1
    association_count = 1
    essential = 0 // The property is not essential
    property_index = 1 // Exposure in property of property_index=1
    // Item #2
    item_id = 2
    association_count = 1
    essential = 0
    property_index = 3 // Exposure in property of property_index=3
    // Item #3
    item_id = 3
    association_count = 1
    essential = 0
    property_index = 5 // Exposure in property of property_index=5
    // Item #4
    item_id = 4
    association_count = 1
    essential = 0
    property_index = 2 // Exposure in property of property_index=2
    // Item #5
    item_id = 5
    association_count = 1
    essential = 0
    property_index = 3// Exposure in property of property_index=3
    // Item #6
    item_id = 6
    association_count = 1
    essential = 0
    property_index = 4 // Exposure in property of property_index=4
}
```

In another embodiment, the camera is configured to group the images of a shot consisting in a series of several images at different exposure levels, for example three. In this example, the camera specifies the Property Information in a VisualSampleEntry, i.e. metadata describing one or more samples of a track. In the resulting multi-image file, a chunk will contain a number of samples equal to the number of images, three in the example, taken during the shot. A new specific VisualSampleEntry and corresponding chunk of three samples, according to the example, are created in the 'stbl' box of the recorded multi-image file. The SampleToChunkBox::sample_description_index for this new shot is set equal to the index of the specific VisualSampleEntry in the 'stbl' box. At the end of the shooting sequence, the user gets a multi-image file made up of one track containing and describing all the pictures. Through the camera UI, he can see the sequences of shots as a series of three images.

In another example, the images organized in a different ways may be accessed per exposure level. If the camera is configured to group the images per exposure level, then each chunk contains one image. One specific visual sample entry is declared per exposure level. If N specific VisualSampleEntries are declared and if the camera always captures the pictures in the same order (e.g. under exposed, normal, over exposed), then the SampleToChunkBox::sample_description_index can be set equal to (picture index in the shot) modulo N. At the end of the shooting sequence, the user gets a multi-image file made up of one track containing and describing all the pictures. Through the camera UI, the recorded pictures may be seen organized according to their exposure level. To describe the samples per exposure level, the use of specific sample groups as described in previous embodiments is preferred, especially the use of CompactSampleGroup that relies on patterns of samples. It is the case here, when the exposure levels occur in the same order. A pattern is identified and the sample group is defined as a pattern of samples, each sample group being associated to a sample group entry in the corresponding SampleGroupDescriptionBox. The use of classical sample groups, i.e. without patterns, is also possible and is preferred over VisualSampleEntry since changing the sample entry might lead to decoder reset in some implementations, which is not the case with sample groups.

Generic Capture Series Grouping Type Associated with Properties

This third embodiment is a variant of the second embodiment regarding generic capture series grouping type.

In this variant, additional parameters are defined for the generic capture-time grouping type (e.g. noted 'case' for capture series) to provide parameters that are common to all items in the group (e.g. exposure, white-balance, panorama . . . ) and to link the group with item properties that precise parameters specific to an item within the group. In particular, a 'capture_mode' parameter signals the four characters code that identifies the Property Information (Property's property_type) that further describes the parameters specific to an item (for example the images described as image items). The principle is that one HEIF parser may determine the type of Property Information (i.e. the type of the ItemProperty or SampleGroupDescriptionBox or SampleEntry) from the 'capture_mode' parameter of the generic capture-time grouping type.

The principle is that one HEIF reader may easily retrieve the Item Property among all Item Properties associated to a given group of items.

The syntax of the Grouping Information when described as EntityToGroup is described below:

```
aligned(8) class EntityToGroupBox('case', version, flags)
    extends FullBox('case', version, flags) {
        unsigned int(32) group_id;
        unsigned int(32) num_entities_in_group;
        for(i=0; i<num_entities_in_group; i++)
            unsigned int(32) entity_id;
        //    Parameters below provide common parameters for the grouping_type 'case'
        unsigned int(32) capture_mode; // 4CC identifying the capture mode
    }
``` where capture_mode identifies the capture mode. Item properties with same four characters code provide item-specific parameters for a given capture_mode.

For each item in the group, an item property with the same 4CC as the 'capture_mode' defines the item-specific parameters for this 'capture_mode'.

e.g.: The following 4CC codes can be defined for capture_mode:

| Capture mode type | 4cc code |
| --- | --- |
| Auto Exposure bracketing | aebr |
| White balance bracketing | wbbr |
| Focus bracketing | fobr |
| Flash Exposure bracketing | afbr |
| Depth of field bracketing | dobr |
| Panorama | pano |
| User-defined capture series | udcs |
| Time lapse | tila |
| Super Resolution | sres |
| Multi Exposure | mult |
| Noise Reduction | nois |
| Long-Exposure noise reduction | dark |
| Vignetting Compensation | flat |
| HDR | hdr |

Examples of Item Property to define for above capture_mode.

```
aligned(8) class AutoExposureBracketingProperty
extends ItemProperty('aebr') {
    int (8) exposure_step;
    int (8) exposure_numerator;
}
``` where exposure_step is an integer value that specifies the increment steps used for the exposure bracketing. When equals to 1, full stop increment is used, when equals to 2, half stop increment is used, when equals to 3, third stop increment is used, and when equals to 4, a quarter stop increment is used. exposure_numerator is an integer value specifying the exposure numerator used to compute the exposure value stop of the item.

The exposure value (EV) stop of the associated item is then equal to the result of the following formula: exposure_numerator/exposure_step.

```
aligned(8) class WhiteBalanceBracketingProperty
extends ItemProperty('wbbr') {
    unsigned int (32) color_temperature
}
``` where color_temperature represents the color temperature value in Kelvin.

In another embodiment, the WhiteBalanceBracketingProperty is defined as follows:

```
aligned(8) class WhiteBalanceBracketingProperty
extends ItemProperty('wbbr') {
    int(8) blue_amber;
    int(8) green_magenta;
}
``` where blue_amber is the value of the white balance compensation on the blue-amber axis. This blue_amber field represents the 'color temperature'.

and green_magenta is the value of the white balance compensation on the green-magenta axis. The green_magenta field represents the 'tint'.

```
aligned(8) class FocusBracketingProperty
extends ItemProperty('fobr') {
    usigned int (32) focus_distance_numerator
    usigned int (32) focus_distance_denominator
}
``` where the focus distance is expressed in meter as the ratio of focus_distance_numerator and focus_distance_denominator.

```
aligned(8) class FlashExposureBracketingProperty
extends ItemProperty('afbr') {
    int (8) flash_exposure_numerator;
    int (8) flash_exposure_denominator;
}
``` where the flash exposure compensation is expressed in a number of f-stops as the ratio of flash_exposure_numerator and flash_exposure_denominator.

```
aligned(8) class DepthOfFieldBracketingProperty
extends ItemProperty('dobr') {
    int (8) f_stop_numerator;
    int (8) f_stop_denominator;
}
``` where the aperture change is expressed in a number of f-stops as the ratio of f_stop_numerator and f_stop_denominator.

```
aligned(8) class PanoramaBracketingProperty
extends ItemProperty('pano') {
    unsigned int (1) panorama_direction
    unsigned int(15) frame_number;
}
``` where panorama_direction is a 1-bit flag signaling the panorama direction (0: left-to-right, 1: right-to-left) and frame_number an integer representing the frame number according to the panorama direction (lower to higher).

In another embodiment, the syntax may be:

```
aligned(8) class PanoramaBracketingProperty
extends ItemProperty('pano') {
    unsigned int (1) panorama_direction;
    unsigned int (7) reserved;
}
``` with the following semantics:

panorama_direction is a 1-bit flag signaling the panorama direction (0: left-to-right, 1: right-to-left). The frames are ordered according to the default group ordering.

In yet another embodiment, the syntax may be:

```
aligned(8) class PanoramaBracketingProperty
extends ItemProperty('pano') {
    unsigned int (8) panorama_type;
    if (panorama_type == 4) {
        unsigned int (8) rows;
        unsigned int (8) columns;
    }
    if (panorama_type == 5) {
        unsigned int (8) rows;
        for (i = 0; i < rows; i++) {
            unsigned int (8) columns;
        }
    }
}
```

```
if (panorama_type == 8) {
    unsigned int(32) panorama_subtype;
}
}
``` with the following semantics:
panorama_type is an unsigned integer, for example on 8 bits, signaling the type of panorama used:
0: left-to-right horizontal panorama
1: right-to-left horizontal panorama
2: top-to-bottom vertical panorama
3: bottom-to-top vertical panorama
4: grid panorama, which has two additional parameters:
  rows is the number of rows in the grid
  columns: is the number of columns in the grid. Possibly this parameter may not exist and the number of columns is computed from the total number of images in the group and the number of rows.
5: irregular grid panorama, which has several other parameters:
  rows is the number of rows in the grid
  columns: is the number of columns for each row in the grid.
6: cubic panorama, with the images ordered according to the front, left, back, right, top, bottom order. Possibly other ordering, or other types of cubic panorama with different ordering could be defined.
7: unspecified panorama, where the exact type of the panorama is not specified.
8: user-defined panorama, which has another parameter, panorama_subtype, which is a 4CC identifying the type of panorama.

For horizontal and vertical panorama, a flag can be added to indicate whether the panorama is a full 360° panorama, where the last image is merged with the first image.

For grid panorama (regular or not), flags could be added in the same way, to indicate whether the panorama covers 360° horizontally, vertically, or in both directions.

```
aligned(8) class UserDefinedCaptureSeriesProperty
    extends ItemProperty('udcs') {
    utf8string label
}
``` where label a null-terminated string in UTF-8 characters which gives a human-readable name for the user-defined capture series.

The Time-Lapse property syntax may be:

```
aligned(8) class TimeLapseProperty
    extends ItemProperty('tila') {
    unsigned int(32)  time_delta;
}
```

With the following semantics:
time_delta is the number of hundredth of seconds elapsed between the image item and the previous one in the burst. Using an elapsed time between two successive items enables to use a single property for all the items when they are captured on a regular time-frame.
This property should be absent or ignored for the first image item in an entity group of type 'tila'.

In yet another embodiment, the Time Lapse Property syntax may be:

```
aligned(8) class TimeLapseProperty
    extends ItemProperty('tila') {
    unsigned int(32)  capture_time;
}
``` with the following semantics:
capture_time is the number of hundredth of seconds elapsed between the image item and a reference time from the capturing device. Using a value relative to an external reference enables to signal that two items were captured simultaneously (i.e. are synchronized) by giving them the same capture time.

In yet another embodiment, the syntax may be:

```
aligned(8) class TimeLapseProperty
    extends ItemProperty('tila') {
    unsigned int(32)  time_delta;
    unsigned int(32)  group_id;
}
```

With the following semantics:
time_delta is the number of hundredth of seconds elapsed between the image item and the previous one in the burst.
group_id is the identifier of the targeted EntityToGroup. This property should be absent or ignored for the first image item in an entity group of type 'tila'.

```
aligned(8) class MultiExposureProperty
    extends ItemProperty('mult') {
    unsigned int (8) weight;
}
```

With the following semantics:
weight indicates the alpha blending coefficient for this image.

```
aligned(8) class LongExposureNoiseReductionProperty
    extends ItemProperty('dark') {
}
``` with the following semantics:
an item with the LongExposureNoiseReductionProperty correspond to a 'dark' image.

```
aligned(8) class VignettingCompensationProperty
    extends ItemProperty('flat') {
}
``` with the following semantics:
an item with the VignettingCompensationProperty correspond to a 'flat' image.

For all these properties, when applicable, the parameter values can either be absolute or relative. An absolute value means that the reference is external to the grouping. A relative value means that the value is specified as a difference with the value for another image of the grouping. By default the reference item used for relative values if the first one in the grouping. In some cases, the reference item the reference item can be the previous one in the grouping. For example, the capture time in a time lapse is either an absolute time, corresponding to a pre-defined reference time, or it is a relative time where only the time difference with the previous image is given.

Preferably, for bracketing the capture settings are specified as relative to the camera settings. This enables several grouping using the same bracketing mode to share the same reference for the values from the Property Information. In this way, an item that belongs to several grouping using the same capture mode has only one Property Information corresponding to this capture mode attached to it.

In an embodiment, when using relative values, the Property Information contains the identifier of the group. This enables an item to belong to several grouping using the same capture mode, as the Property Information for each group is linked to its group by the identifier it contains.

In this embodiment, the Property Information for the auto exposure bracketing mode may be:

```
aligned(8) class AutoExposureBracketingProperty
extends ItemProperty('aebr') {
    int (8) exposure_step;
    int (8) exposure_numerator
    unsigned int(32) group_id;
}
``` where group_id is the identifier of the group owning the item associated to this property and for which the property applies.

An example of this embodiment of a capture using auto exposure bracketing mode resulting in three images stored as items.

The file structure may be:
Item #1: ItemId=1; exposure_stop=−2//exposure=low
Item #2: ItemId=2; exposure_stop=0//exposure=mid
Item #3: ItemId=3; exposure_stop=2//exposure=high An EntityToGroupBox with 'case' grouping type value and 'aebr' capture mode is defined:

```
GroupsListBox{
    EntityToGroupBox('case') {
        group_id='1234'
        num_entities_in_group=3
        entity_id=1
        entity_id=2
        entity_id=3
        capture_mode='aebr'
    }
}
ItemPropertyContainerBox {
    AutoExposureBracketingProperty('aebr') {
        exposure_step = 1;
        exposure_numerator = −2;
    }
    AutoExposureBracketingProperty('aebr') {
        exposure_step = 1;
        exposure_numerator = 0;
    }
    AutoExposureBracketingProperty('aebr') {
        exposure_step = 1;
        exposure_numerator = 2
    }
}
ItemPropertyAssociation{
    entry_count = 3
    item_id = 1
    association_count = 1
    essential = 0
    property_index = 1
    item_id = 2
    association_count = 1
    essential = 0
    property_index = 2
    item_id = 3
    association_count = 1
```

-continued

```
    essential = 0
    property_index = 3
}
```

Groups of images can also be encapsulated into one or more 'pict' tracks. Each image can be a sync sample (all intra) or may use inter prediction.

For example, for images sequences the principle is to rely on sample grouping and to define a dedicated grouping_type and sample group description for each kind of capture modes. For example, 'aebr' indicates group of image samples for an automatic exposure bracketing. A corresponding VisualSampleGroupEntry would be defined as follows:

```
{aligned(8) class AutoExposureBracketingEntry extends
VisualSampleGroupEntry('aebr') }
    int (8) exposure_order;
    int (8) exposure_step;
    int (8) exposure_stop;
}
``` where exposure_order parameter specifies the order of the image in the bracketing set. exposure_step is an integer value that specifies the increment steps used for the exposure bracketing. When equals to 1, full stop increment is used, when equals to 2, half stop increment is used, when equals to 3, third stop increment is used, and when equals to 4, a quarter stop increment is used. exposure_stop is an integer value specifying the maximum exposure value (EV) stop of the sample.

The exposure stop of the associated image is then equal to the result of the following formula: −1*exposure_stop/exposure_step.

Similar definitions can be defined for all other capture modes

In case the property related to the capture series does not vary over time, default sample grouping mechanism can be used or Item Property can be defined in VisualSampleEntry (as for 'pasp', 'colr' or 'clap' Item Properties).

In an alternative of this embodiment, the capture mode refers to a PropertyInformation described in Proprietary box. As a result, the capture_mode parameter refers to a four characters code of a Proprietary box (e.g. a 'uuid' box). In such case, the Grouping Information further describes data that identifies precisely which proprietary information pertains to the images in the 'case' group. For instance, when capture_mode is equal to 'uuid' the Property Information specifies the usertype field of the box of the 'uuid' type. A HEIF reader could advantageously determine the Proprietary box that further describe the capture mode. This embodiment applies also to any other Proprietary box extension system that includes a four characters code (generally referred as sub_type or proprietary_type) that permits to distinguish the different Proprietary boxes.

In another alternative of this embodiment, the grouping type listed in the first embodiment may further specify Property Information with a four characters code equal to the grouping type. For instance, the capture device declares an Auto Exposure Bracketing group with grouping_type equal to 'aebr' and associates an ItemProperties 'aebr' with each Item pertaining to the group.

For instance, for image items the principle is to define several specific grouping types for EntityToGroup corresponding to the different grouping purposes (capture modes). The same 4CC is used for the grouping_type of a given EntityToGroup and for the Item Property that provides the parameters specific to an item within the corresponding group. For example, the parameters of items pertaining to an EntityToGroup('aebr') are provided by ItemProperty ('aebr') where 'aebr' is the FourCC for auto-exposure bracketing set.

In a variant of this embodiment, grouping types corresponding to the combination of two or more capture modes are defined.

In another variant of this embodiment, the 'case' EntityToGroup specifies several capture_mode. For each capture_mode and for each item in the group, an item property with the same 4CC as the capture_mode defines the item-specific parameters for this capture_mode.

The syntax of the Grouping Information when described as EntityToGroup is described below:

```
aligned(8) class EntityToGroupBox('case', version, flags)
extends FullBox('case', version, flags) {
    unsigned int(32) group_id;
    unsigned int(32) num_entities_in_group;
    for(i=0; i<num_entities_in_group; i++)
        unsigned int(32) entity_id;
    // Parameters below provide common parameters for the
    grouping_type 'case'
    unsigned int(8) num_capture_mode;
    for(i=0, i<num_capture_mode; i++)
        unsigned int(32) capture_mode; // 4CC identifying
    the capture mode
}
```

It is worth noting that this syntax and the syntax with a single capture_mode could be grouped into a single definition using two different versions.

This variant could also be used for different Grouping Information.

VisualSampleEntry

In a fourth embodiment, the information common to all the images in the capture series is stored in a new box in VisualSampleEntry of the 'pict' or 'vide' track. This new box signals that the samples of the track associated to this sample entry pertains to same capture mode (e.g. bracketing set, image burst, photo series . . . ). The sample-specific information, (described for example as Property Information in previous embodiments) are stored in a dedicated metadata track. For example, the VisualSampleEntry indicates that the capture mode is auto exposure bracketing. The parameters of the bracketing (i.e. exposure configuration) are described in the samples of the metadata track.

The capture device may associate the track describing the image samples with one or more metadata tracks describing the sample-specific information via a track reference of type 'cdsc'.

New Item Property and Sample Entry for Tagging.

In a fifth embodiment, the Property Information describes information to annotate a series of images. This Property Information includes a label parameter as a null-terminated string in UTF-8 characters that gives a human-readable name for the tag. In one alternative, this property is declared as other item properties in the 'ipco' box and can be associated to items in 'ipma' box. For instance, the table below describes the syntax of the ItemProperty (or ItemFullProperty) that contains the label parameter. The camera device fills the content of this label parameter with a string of UTF-8 characters typically defined by the user. In one alternative, the label contains information describing the context of the shooting. For instance, the user may enter a string or the capture device may generate a string that contains the date and the location of the capture. For example, this string may contain "Captured in May 2013 at Paris, Visit of Eiffel Tower". In particular, the capture device may use image recognition program available on the device to automatically generate the label.

```
aligned(8) class Label
    extends ItemProperty('labl') {
    utf8string label
}
```

In one alternative, the Property Information is described as one SampleEntry or SampleGroupEntry for a series of images described in one 'trek' container. The syntax of the Property Information in this context is the following. In such a case, the syntax is close to ItemProperty syntax as represented below.

```
Box type: 'aebr'
Container: VisualSampleEntry
Mandatory: No
Quantity: Zero or one
aligned(8) class Label extends Box('labl') {
    utf8string label
}
```

As a result, the label is an UTF-8 string describing the content of a sample in a track.

In another embodiment, the Grouping Information indicates that a series of images are related (without precise purpose) through a specific string. For Entity grouping, the grouping type is set equal to 'labl' or 'tag' four character code.

In another alternative, the tag or label property can also be associated to a group of items with a different grouping type than 'labl' or 'tag'.

In another embodiment, the Photo Series or User Collection Property information includes a label parameter as an additional parameter.

The syntax is for example as follows:

```
aligned(8) class UserDefinedCaptureSeriesProperty
    extends ItemProperty('udcs') {
    utf8string label
}
``` where label a null-terminated string in UTF-8 characters which gives a human-readable name for the user-defined capture series.

Item Property Association to Refer to a Group.

In a sixth embodiment, the Property Information applies to several images (i.e. either items or samples) which are gathered in one group by the Grouping Information (for instance, through signaling in one EntityToGroup or SampleToGroup box). In such a case, the Property Information is associated with one group instead of one image. For example, the ItemPropertyAssociation box allows referring to an identifier of group (for example to the EntityToGroup::group_id parameter) that groups a series of items. The item_ID field of the 'ipma' box is then replaced by an entity_id which may refer to either an identifier of Item (item_ID) or to a group identifier (group_id). For instance, the Grouping Information is an EntityToGroup. The identifier that one ItemPropertyAssociation box may refer to is the group_id field. The advantage of this embodiment is that the description of the properties of each image is more compact since repetition of associations is avoided.

The Table below is the new syntax of the ItemPropertyAssociation box:

```
aligned(8) class ItemPropertyAssociation extends FullBox('ipma',
version, flags)
{
    unsigned int(32) entry_count;
    for(i = 0; i < entry_count; i++) {
        if (version < 1)
            unsigned int(16)    entity_ID;
        else
            unsigned int(32)    entity_ID;
        unsigned int(8) association_count;
        for (i=0; i<association_count; i++) {
            bit(1) essential;
            if (flags & 1)
                unsigned int(15) property_index;
            else
                unsigned int(7) property_index;
        }
    }
}
```

The semantics of the different parameters of ItemPropertyAssociation remain unchanged except item_ID field which is renamed to entity_ID. The entity_ID parameter may refer either to one item or to one EntityToGroup. Thus, the value of entity_ID should be equal to one group_id value or to one item_ID value.

In an embodiment, the same mechanism is used to link a property a group of any kind of media entities, such as for example audio samples, metadata items . . . .

For example, the capture device employs the user collection capture mode and describes each image as one Item. For instance, the capture device stores four images. The Property Information shared with each Item corresponds to the label set by the photographer as in previous embodiment. The HEIF boxes describes thus four Items (one for each image of the user collection)

Item #1: ItemId=1;
Item #2: ItemId=2;
Item #3: ItemId=3;
Item #4: ItemId=4;

The Grouping Information is described as an EntityToGroupBox with 'case' grouping type value, which gathers the set of four items. Then, a label is described which is common to all items. This corresponding property, identified by the 'labl' code, is for example, a label set by the user such as a product reference or a predetermined value for instance the date of capture of the first image in the set. The association of the property with the item is described in one ItemPropertyAssociation box. In this embodiment, the ItemPropertyAssociation box contains only a single entry for the four items. The HEIF writer associates the property with the identifier of the group defined in the 'case' group defined in the EntityToGroup box. This mutualisation can be applied to other properties, for example the sizes ('ispe') or the decoding configuration ('hvcC'). The table is a pseudo-code of the description of the HEIF file for this example:

```
GroupsListBox{
    EntityToGroupBox('case') {
        group_id='1234'
        num_entities_in_group=4
        entity_id=1
```

```
        entity_id=2
        entity_id=3
        entity_id=4
    }
}
ItemPropertyContainerBox {
    'ispe' {1920 1080}
    'hvcC' {...}
    'labl' {
        label = "Product ref. 32184103"
    }
}
ItemPropertyAssociation{
    entry_count = 1
    entity_id = 1234
    association_count = 3
    essential = 0, property_index=1;      // sizes
    essential = 1, property_index=2;      // decoder configuration
    essential = 0, property_index = 3     // label
}
```

A writer may keep on associating sizes and decoder configuration on an image basis and only share the property specific to the grouping type (the 'labl' in the example below):

```
ItemPropertyAssociation{
    entry_count = 5
// Properties associated to the group
    entity_id = 1234
    association_count = 1
    essential = 0, property_index = 3 // label
// Properties associated to the image item #1
    entity_id = 1
    association_count = 2
    essential = 0, property_index = 1 // sizes
    essential = 1, property_index = 2 // decoder configuration
// Properties associated to the image item #2
...
// Properties associated to the image item #3
...
// Properties associated to the image item #4
    entity_id = 4
    association_count = 2
    essential = 0, property_index = 1 // sizes
    essential = 1, property_index = 2 // decoder configuration
}
```

As can be seen from the above example, having the Image property association map allowing association of one or more property to a group of images or entities leads to a less verbose description of the image file.

ItemReference.

In a seventh embodiment, the relationships between the series of images captured are described in one capture series as ItemReference. The ItemReferenceBox describes the reference between two items of an HEIF file and associates a type of Reference to each association through reference_type parameter. In this embodiment, one reference type is defined for each capture mode. The four character code of the reference_type to use for a given capture mode is the same as the one described for grouping_type.

The principle is to set one item reference between each image captured by the device in the capture order. For example, the second image of the series of images thus describes a reference to the first image of the series, and the third image describes a reference to the second image and so on.

Depending on the reference_type value, the HEIF parser determines the relationship between a first and a second item.

For example, when reference_type is equal to:
'pano': the second item is the image that follows the first item in the capture pattern of the panorama. If the capture pattern is from left to right, the second item is at the right of the first item. By default, the left to right pattern is assumed.
'panh' is an alternative to 'pano': the second item is the image that follows horizontally the first item in the capture pattern of the panorama. If the capture pattern is from left to right, the second item is at the right of the first item. By default, the left to right pattern is assumed. In another embodiment, a 'pan H' reference_type is used for right to left panoramas.
'panv': the second item is the image that follows horizontally the first item in the capture pattern of the panorama. If the capture pattern is from top to bottom, the second item is below the first item. By default, the top to bottom pattern is assumed. In another embodiment, a 'panV' reference_type is used for bottom to top panoramas.
'panh', 'panH', and 'pane', 'panV' can be combined to describe grid panorama. Each row is described using a 'panh' or 'panH' reference_type. The relation between two successive rows is described using a 'pane' or 'panV' reference_type between the first images of the two rows.
These reference_type can also be named 'righ', 'left', 'top', 'bon'.
These reference_type can also be used to describe cubic panoramas or more complex panorama.
'imbu' or 'pser' or 'tila' or 'brst': the second item is the image that follows the first item in the order of capture of the set of images.
'tsyn': the second item was captured at the same time as the first item.
'brak': the second item is the image in the bracketing set that follows the first item.
'aebr': the second item is the image in the exposure bracketing set that follows the first item. As a result, the second item as a longer exposure time than the first item when the bracketing is done in ascending order of exposure stop.
'wbbr': the second item is the image in the white balance bracketing set that follows the first item. As a result, the second item as a higher color temperature than the first item when the bracketing is done in ascending order of color temperature.
'fobr': the second item is the image in the focus bracketing set that follows the first item. As a result, the second item as a farther focus distance than the first item when the bracketing is done in ascending order of focus distance.
'sres': the second item is another item of the same super-resolution set.
'mult': the second item is another item of the same multi exposure set.
'hdr': the second item is another item of the same HDR item set.
'nois': the second item is another item of the same noise reduction item set.
'dark': the second item is a dark image that can be used to remove sensor-related noise from the first image.
'flat': the second item is a flat image that can be used to compensate for vignetting the first image.
The principle is the same for the other bracketing types.
In another embodiment, the set of images from the capture series is further processed by the capturing device to generate a new image. For instance, the capture device may generate an HDR image from a series of images captured with auto exposure bracketing. In such a case, an item reference is signaled between the HDR item and the identifier of the group of the series of images in the auto exposure bracketing. Other examples are noise reduction, long-exposure noise reduction, vignetting compensation, super resolution, or multi-exposition images. As a result, the ItemReferenceBox syntax is the following:

```
aligned(8) class SingleItemTypeReferenceBox(referenceType) extends
Box(referenceType) {
    unsigned int(16) from_item_ID;
    unsigned int(16) reference_count;
    for (j=0; j<reference_count; j++) {
        unsigned int(16) to_entity_ID;
    }
}
aligned(8) class SingleItemTypeReferenceBoxLarge(referenceType)
extends Box(referenceType) {
    unsigned int(32) from_item_ID;
    unsigned int(16) reference_count;
    for (j=0; j<reference_count; j++) {
        unsigned int(32) to_entity_ID;
    }
}
aligned(8) class ItemReferenceBox extends FullBox('iref', version, 0)
{
    if (version==0) {
        SingleItemTypeReferenceBox references[ ];
    } else if (version==1) {
        SingleItemTypeReferenceBoxLarge references[ ];
    }
}
```

The new parameter to_entity_ID is an identifier of Item or group. The advantage is that a HEIF parser is able to determine that one item is computed from a group of image.

Several types of reference can be defined to relate a processed image to a group of images. These reference_types can be used either between an item and a group or between an item and several other items.

These new types of references are for example:
'Pano': the item is a panorama item generated from the referenced items.
'Sres': the item is a super-resolution item generated from the referenced items.
'Mult': the item is a multi-exposure item generated from the referenced items.
'Hdr': the item is an HDR item generated from the referenced items.
'Nois': the item is an item with reduced noise generated from the referenced items.
'Dark': the item is an item where long-exposure related noise was removed using the referenced items. The first referenced item is the original long-exposure image, while the second referenced item is the dark image.
'Flat': the item is an item where vignetting was compensated using the referenced items. The first referenced item is the original image, while the second referenced item is the flat image.

One Grouping Type and One Property Information Per Capture Mode.

In an embodiment, a grouping type is defined for each capture mode, as in the first embodiment. In addition a property information is defined for each capture mode, as in the second embodiment. As such, the parameters of the capture mode are described inside the corresponding property information.

In other words, grouping types and property information can be defined as follows.

The 'brst' entity group enables to indicate that a set of image items forms a burst in temporally increasing order.

We propose to build on this group by introducing an associated 'brst' descriptive item property that can be used to document the capture time difference between two successive image items. This item property is useful for example to more fully describe time-lapses.

Image Burst Information

Definition

The image burst 'brst' descriptive item property defines the capture time difference between the associated image item and the previous one in a burst of image items. It should exist one and only one entity group 'brst' referencing the associated image item.

Syntax

```
aligned(8) class ImageBurstProperty
    extends ItemProperty('brst') {
    unsigned int(32) time_delta;
}
```

Semantics time_delta is the number of hundredth of seconds elapsed between the image item and the previous one in the burst. This value shall be interpreted as value 0 if the associated image item is the first image item in an entity group of type 'brst'.

Image Burst Information Alternative

Definition

The image burst 'brst' descriptive item property defines the capture time of the associated image item in a burst of image items. The first image item in a burst of image items represents the time zero at which the burst of image items starts and from which capture time are measured. It should exist one and only one entity group 'brst' referencing the associated image item.

Syntax

```
aligned(8) class ImageBurstProperty
    extends ItemProperty('brst') {
    unsigned int(32) capture_time;
}
```

Semantics capture_time is the number of hundredth of seconds elapsed between the image item and the first image item in the burst. This value shall be interpreted as value 0 if the associated image item is the first image item in the associated entity group of type 'brst'.

Bracketed Sets/Logical Groups

Motivation

Bracketing enables to capture the same content with different camera settings. The most common case is to use exposure bracketing to ensure that all the parts of a scene will be captured with a correct exposure in at least one of the images. Usually, the set of resulting images is processed to obtain the final result (for example by creating a HDR image).

Keeping and making explicit the bracketing relation between the images is very useful for carrying the initial intent of the photographer during all the photo processing workflow. In addition providing a property specifying generic parameter values that differentiate image items inside the bracketing set is also useful to ease the selection of an image item by the client as it can be difficult to determine it from the metadata associated with the different images (it can require computing and crossing multiple values from several image items based on available EXIF fields, or to use maker notes that are specific to each camera maker . . . ).

Related to bracketing, several images can be captured with the intent of creating a panorama. As for bracketing, keeping and making explicit this panomara-related link between the images is very useful. And providing a property specifying the characteristics of the panorama helps processing the images into a panorama.

The following sections propose normative text for the entity and sample groups described in the TuC. Normative text for the corresponding item properties is proposed afterwards.

Auto Exposure Bracketing

'sebr' Entity Group

The auto exposure bracketing entity group ('aebr') indicates a set of image items that were captured with varying exposure settings. The relative exposure setting for each image item in the entity group should be defined using an auto exposure bracketing item property 'aebr'.

'Aebr' Sample Group

Definition

The auto exposure bracketing sample group ('aebr') indicates a set of samples that were captured with varying exposure settings. There may be several sample groups of type 'aebr', each with a different value of grouping_type_parameter. AutoExposureBracketingEntry provides the relative exposure setting for samples associated with this entry in the sample group.

Syntax

```
aligned(8) class AutoExposureBracketingEntry
    extends VisualSampleGroupEntry('aebr') {
    int(8) exposure_step;
    int(8) exposure_numerator;
}
```

Semantics exposure_step is an integer value that specifies the increment steps used during the exposure bracketing. When equals to 1, a full stop increment is used, when equals to 2, a half stop increment is used, when equals to 3, a third stop increment is used, and when equals to 4, a quarter stop increment is used.

exposure_numerator is an integer value specifying the exposure numerator used to compute the exposure value stop of the item.

The exposure value variation of the image item compared to the default Automatic Exposure camera settings is expressed as a number of stops that is computed as exposure_numerator/exposure_step.

White Balance Bracketing

'wbbr' Entity Group

The white balance bracketing entity group ('wbbr') indicates a set of image items that were captured with varying white balance settings. The relative white balance setting for each image item in the entity group should be defined using a white balance bracketing item property 'wbbr'.

'wbbr' Sample Group

Definition

The white balance bracketing sample group ('wbbr') indicates a set of samples that were captured with varying white balance settings. There may be several sample groups of type 'wbbr', each with a different value of grouping_type_parameter. WhiteBalanceBracketingEntry provides the white balance compensation on Blue/Amber bias and/or Magenta/Green bias for samples associated with this entry in the sample group.

Syntax

```
aligned(8) class WhiteBalanceBracketingEntry
    extends VisualSampleGroupEntry('wbbr') {
    int(8) blue_amber;
    int(8) green_magenta;
}
```

Semantics blue_amber is the value of the white balance compensation in the blue-amber axis.

green_magenta is the value of the white balance compensation in the green-magenta axis.

Focus Bracketing

'Fobr' Entity Group

The focus bracketing exposure bracketing entity group ('fobr') indicates a set of image items that were captured with varying focus settings. The relative focus setting for each image item in the entity group should be defined using a focus bracketing item property 'fobr'.

'fobr' Sample Group

Definition

The focus bracketing exposure bracketing sample group ('fobr') indicates a set of samples that were captured with varying focus settings. There may be several sample groups of type 'fobr', each with a different value of grouping_type_parameter. FocusBracketingEntry provides the relative focus setting for samples associated with this entry in the sample group.

Syntax

```
aligned(8) class FocusBracketingEntry
    extends VisualSampleGroupEntry('fobr') {
    unsigned int(32) focus_distance_numerator;
    unsigned int(32) focus_distance_denominator;
}
```

Semantics

The focus distance is expressed in meter as the ratio of focus_distance_numerator and focus_distance_denominator.

Flash Exposure Bracketing

'Afbr' entity group

The flash exposure bracketing entity group ('afbr') indicates a set of image items that were captured with varying flash exposure settings. The relative flash exposure setting for each image item in the entity group should be defined using a flash exposure bracketing item property 'afbr'.

'afbr' sample group

Definition

The flash exposure bracketing sample group ('afbr') indicates a set of samples that were captured with varying flash exposure settings. There may be several sample groups of type 'afbr', each with a different value of grouping_type_parameter. FlashExposureBracketingEntry provides the relative flash exposure setting for samples associated with this entry in the sample group.

Syntax

```
aligned(8) class FlashExposureBracketingEntry
    extends VisualSampleGroupEntry('afbr') {
    int(8) flash_exposure_numerator;
    int(8) flash_exposure_denominator;
}
```

Semantics

The flash exposure variation of the sample compared to the camera settings is expressed as a number of stops, and is computed as flash_exposure_numerator/flash_exposure_step.

Depth of Field Bracketing

'dobr' entity group

The depth of field bracketing entity group ('dobr') indicates a set of image items that were captured with varying depth of field settings. The relative depth of field setting for each image item in the entity group should be defined using a depth of field bracketing item property 'dobr'.

'dobr' Sample Group

Definition

The depth of field bracketing sample group ('dobr') indicates a set of samples that were captured with varying depth of field settings. There may be several sample groups of type 'dobr', each with a different value of grouping_type_parameter. DepthOfFieldBracketingEntry provides the relative depth of field setting for samples associated with this entry in the sample group.

Syntax

```
aligned(8) class DepthOfFieldBracketingEntry
    extends VisualSampleGroupEntry('dobr') {
    int(8) f_stop_numerator;
    int(8) f_stop_denominator;
}
```

Semantics

The depth of field variation is expressed as an aperture change in a number of stops, and is computed as f_stop_numerator/f_stop_denominator.

Panorama

'Pano' Entity Group

The panorama entity group ('pano') indicates a set of image items that were captured in order to create a panorama. The position for each image item from the entity group inside the panorama should be defined using a panorama item property 'pano'.

'Pano' Sample Group

Definition

The panorama sample group ('pano') indicates a set of samples that were captured in order to create a panorama. There may be several sample groups of type 'aebr', each with a different value of grouping_type_parameter. PanoramaEntry provides the position for samples associated with this entry in the sample group.

Syntax

```
aligned(8) class PanoramaEntry
    extends VisualSampleGroupEntry('pano') {
    unsigned int(1) panorama_direction;
    unsigned int(15) frame_number;
}
```

Semantics panorama_direction is a 1-bit flag signaling the panorama direction (0: left-to-right, 1: right-to-left)

frame_number an integer representing the frame number according to the panorama direction (lower to higher).

Item Properties

Motivation

The following sections propose normative text for item properties to specify the entity groups related to bracketing, panorama, and burst.

Auto Exposure Bracketing Information

Definition

The auto exposure bracketing descriptive item property defines the exposure variation of the associated image item relatively to the camera settings.

It is used to specify the properties of an image item included in an 'aebr' entity group.

Syntax

```
aligned(8) class AutoExposureBracketingProperty
    extends ItemProperty('aebr') {
        int(8) exposure_step;
        int(8) exposure_numerator;
}
```

Semantics exposure_step is an integer value that specifies the increment steps used during the exposure bracketing. When equals to 1, a full stop increment is used, when equals to 2, a half stop increment is used, when equals to 3, a third stop increment is used, and when equals to 4, a quarter stop increment is used.

exposure_numerator is an integer value specifying the exposure numerator used to compute the exposure value stop of the item.

The exposure value variation of the associated image item compared to the camera settings is expressed as a number of stops, and is computed as exposure_numerator/exposure_step.

White Balance Bracketing Information

Definition

The white balance bracketing descriptive item property defines the white balance compensation on Blue/Amber bias and/or Magenta/Green bias applied to the associated image item relatively to the camera settings.

It is used to specify the properties of an image item included in a 'wbbr' entity group.

Syntax

```
aligned(8) class WhiteBalanceBracketingProperty    extends
ItemProperty('wbbr') {
        int(8) blue_amber;
        int(8) green_magenta;
}
```

Semantics blue_amber is the value of the white balance compensation in the blue-amber axis.

green_magenta is the value of the white balance compensation in the green-magenta axis.

Focus Bracketing Information

Definition

The focus bracketing descriptive item property defines the focus variation of the associated image item relatively to the camera settings.

It is used to specify the properties of an image item included in a 'fobr' entity group.

Syntax

```
aligned(8) class FocusBracketingProperty
    extends ItemProperty('fobr') {
        unsigned int(32) focus_distance_numerator;
        unsigned int(32) focus_distance_denominator;
}
```

Semantics

The focus distance is expressed in meter as the ratio of focus_distance_numerator and focus_distance_denominator.

Flash Exposure Bracketing Information

Definition

The flash exposure bracketing descriptive item property defines the flash exposure variation of the associated image item relatively to the camera settings.

It is used to specify the properties of an image item included in an 'afbr' entity group.

Syntax

```
aligned(8) class FlashExposureBracketingProperty
    extends ItemProperty('afbr') {
        int(8) flash_exposure_numerator;
        int(8) flash_exposure_denominator;
}
```

Semantics

The flash exposure variation of the image item relatively to the camera settings is expressed as a number of stops, and is computed as flash_exposure_numerator/flash_exposure_step.

Depth of Field Bracketing Information

Definition

The depth of field bracketing descriptive item property defines the depth of field variation of the associated image item relatively to the camera settings. It is expressed as an aperture change. It is used to specify the properties of an image item included in an 'dobr' entity group.

Syntax

```
aligned(8) class DepthOfFieldBracketingProperty
    extends ItemProperty('dobr') {
        int(8) f_stop_numerator;
        int(8) f_stop_denominator;
}
```

Semantics

The depth of field variation is expressed as an aperture change in a number of stops, and is computed as f_stop_numerator/f_stop_denominator.

Panorama Information

Definition

The panorama descriptive item property defines the position of the associated image item inside a panorama. It is used to specify the properties of an image item included in an 'pano' entity group. It should exist one and only one entity group 'pano' referencing the associated image item.

Syntax

```
aligned(8) class PanoramaProperty
    extends ItemProperty('pano') {
```

-continued

```
        unsigned int(1) panorama_direction;
        unsigned int(15) frame_number;
}
```

Semantics panorama_direction is a 1-bit flag signaling the panorama direction (0: left-to-right, 1: right-to-left)

frame_number an integer representing the frame number according to the panorama direction (lower to higher).

Figure 3:
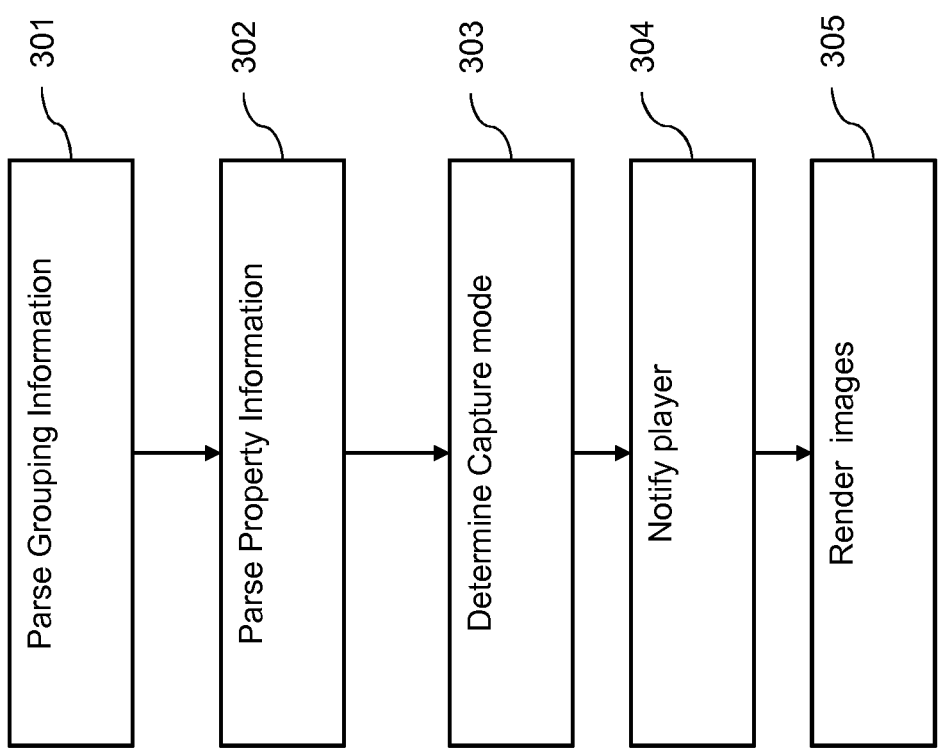
FIG. 3 illustrates the main steps of a parsing process of and HEIF file generated by the encapsulating process of FIG. 2.

FIG. 3 illustrates the main steps of a parsing process of and HEIF file generated by the encapsulating process of FIG. 2. The decoding process starts by the parsing of an HEIF file with a series of images. In a step 301 the Grouping Information is parsed. The capture mode of the series of images is determined in a step 303 when the Grouping Information is present i.e. the HEIF file includes an EntityToGroup or TrackGroup or SampleToGroup box with a grouping_type equal to one of the value previously described. In a first alternative, the grouping_type parameter specifies directly the capture mode. In a second alternative, the Grouping Information signals that the set of images belong to a capture series group (the grouping type is equal to 'case'). In this case, the Property Information is parsed in a step 302 in either ItemProperty, ItemFullProperty or VisualSampleEntry or VisualSampleGroupEntry box to determine in a step 303 the capture mode of the group of images and the parameter associated to the set and to each image of the capture series.

When the capture mode corresponds to a bracketing capture mode, the decoder notifies in a step 304 the player that the HEIF file contains a series of bracketing images. In such a case, the application provides a GUI interface that permits to view the different bracketing alternatives. In one embodiment, the interface provides the information provided in the Property Information such as the ItemProperties to extract the characteristics of the capture associated to each image. In particular, for auto exposure bracketing the exposure stop of each shot are displayed in a step 305 in order to allow a user to select the appropriate shot. Upon selection of the preferred exposure, the decoding device may modify the HEIF file to mark the selected image as "primary item".

When the capture mode corresponds to a Panorama image, the decoder notifies in step 304 the player that HEIF file contains a series of images in which the user may navigate. The GUI interface may indicate specific GUI elements to allow a user to navigate between the images as a spatial composition. The player parses the Property Information to extract the pattern of capture of the set images (for example from left to right) in order to generate a navigation interface adapted to the pattern. For example, if the pattern of capture is from left to right, the GUI interface provides horizontal navigation arrows to navigate between the items of the HEIF file.

When the capture mode corresponds to a Photo Series or an Image Burst, the decoder notifies in step 304 the player, for example, to start a diaporama between all the images of the Photo Series or Image Burst group. In one embodiment, the display time of each image in the diaporama is a function of the timing Interval specified in Property Information of Image burst group.

In one embodiment, the player displays the label information provided in the Property Information at the beginning of the diaporama or as a watermarking in each image to allow the user to identify rapidly the content of the Photo Series. In another embodiment, the user may select one image as the preferred image from the series of images of the Photo series group. In such a case, the preferred image is marked as the Primary Item. In another embodiment, the user may select several images as preferred images from the Photo Series. In such a case, the player creates a new Photo Series group with the selected images and associates the same label Property Information. A new boolean parameter in Property Information indicates that the Photo Series is the Primary group of the Photo Series.

According to an embodiment, a new EntityToGroup inherited from EntityToGroupBox is defined with a unique generic grouping_type value covering all capture or collection modes. The particular type of capture or collection mode is defined as an additional attribute of the EntityToGroupBox.

For example, a new EntityToGroup with a generic 'brak' (for bracketing) or 'case' (for capture series) or 'lgrp' (for logical grouping) grouping type (or any non-already used four character code might be used with equivalent semantic) may be defined for grouping multiple entities according to a specific capture or collection mode. The particular type of capture or collection mode, for instance namely auto exposure bracketing, white balance bracketing, focus bracketing, flash exposure bracketing, depth of field bracketing, iso bracketing, favourite collection, album collection or user-defined capture series may be signalled using a new parameter capture_mode (or collection_mode, or grouping_mode or logical_grouping_type) of the EntityToGroupBox('case') or equivalent grouping_type.

An example of syntax of the Grouping Information when described as EntityToGroup is described below:

```
aligned (8) class EntityToGroupBox('case', version, flags)
    extends FullBox('case', version, flags) {
    unsigned int(32) group_id;
    unsigned int(32) num_entities_in_group;
    for(i=0; i<num_entities_in_group; i++)
        unsigned int(32) entity_id;
    // Parameters below provide common parameters for the grouping_type 'case'
    unsigned int(32) capture_mode; // 4CC identifying the capture or collection
        mode
}
``` where capture_mode identifies the capture or collection mode.

Equivalent syntax with explicit inheritance from EntityToGroupBox is described below:

```
aligned (8) class CaptureSeriesEntityToGroupBox
    extends EntityToGroupBox('case', version, flags) {
    unsigned int(32) capture_mode;
}
```

In some embodiments, CaptureSeriesEntityToGroupBox may also be named LogicalEntityToGroupBox or BracketingEntityToGroupBox.

Alternatively, rather than defining a new 4CC for each capture or collection mode, the capture_mode parameter may be defined as an index in the table below.

The following 4CC codes can be defined for identifying the capture or collection mode:

| Capture mode type | 4cc code |
|---|---|
| Auto Exposure bracketing | 'aebr' |
| White balance bracketing | 'wbbr' |
| Focus bracketing | 'fobr' |
| Flash Exposure bracketing | 'afbr' |
| Depth of field bracketing | 'dobr' |
| Panorama | 'pano' |
| User-defined capture series | 'udcs' |
| Time lapse | 'tila' |
| Super Resolution | 'sres' |
| Multi Exposure | 'mult' |
| Noise Reduction | 'nois' |
| Long-Exposure noise reduction | 'dark' |
| Vignetting Compensation | 'flat' |
| HDR | 'hdr' |
| Album Collection | 'albc' |
| Favourite Collection | 'favc' |

Alternatively, in a variant, new EntityToGroupBoxes with specific grouping_type may be defined for each particular capture or collection mode listed in the above table: 'aebr' for auto exposure bracketing, 'wbbr' for white balance bracketing, etc. . . . .

Examples of the syntax of the new EntityToGroupBoxes are described below (similar syntax may be derived for each capture or collection mode):

```
aligned(8) class AlbumCollectionEntityToGroupBox
    extends EntityToGroupBox('albc', version, flags) {
}
aligned (8) class FavoriteCollectionEntityToGroupBox
    extends EntityToGroupBox('favc', version, flags) {
}
aligned (8) class AutoExposureBracketingEntityToGroupBox
    extends EntityToGroupBox('aebr', version, flags) {
}
```

According to alternatives of this first embodiment, Grouping Information based on above new EntityToGroupBoxes may also include one or more additional tag(s) or label(s) parameters providing null-terminated strings in UTF-8 characters that give a human-readable name, tag(s) or description of the content of the group of entities. Optionally they may also include location information parameter (e.g. GPS coordinates or human-readable description of the location) and language information parameter representing the language of the text contained in other null-terminated string parameters.

Optionally they may also include a parameter providing a unique identifier (e.g. group_uuid or logical_group_id) of the Grouping Information. This unique identifier may be used to associate multiple groups of entities with each other within the HEIF file or across multiple HEIF files (e.g. multiple image files in a directory that belong to the same album). To ensure unicity of this identifier, in particular if it is allocated from different devices, users or vendors, this identifier is defined using a Universally Unique IDentifier (UUID) as specified in RFC4122.

An example of syntax of the generic Grouping Information when described as EntityToGroup is described below (including all optional parameters):

```
aligned (8) class CaptureSeriesEntityToGroupBox
    extends EntityToGroupBox('case', version = 0, flags = 0) {
        unsigned int(32) capture_mode;
        unsigned int(8)[16] group_uuid;
        utf8string group_name;
        utf8string group_description;
        utf8string group_tags ;
        utf8string lang;
}
```

Where:

group_name is a null-terminated UTF-8 character string containing human readable name for the group of entities.

group_description is a null-terminated UTF-8 character string containing human readable description of the group of entities.

group_tags is a null-terminated UTF-8 character string containing comma separated tags related to the group of entities.

lang is a character string containing an RFC 5646 compliant language tag string, such as "en-US", "fr-FR", or "zh-CN", representing the language of the text contained in group_name, group_description and group_tags. When lang is empty, the language is unknown/undefined.

In case specific grouping_type are used instead of a generic grouping_type, examples of the syntax of the specific EntityToGroupBoxes are as follows (with same semantics of parameters than above):

```
aligned(8) class AlbumCollectionEntityToGroupBox
    extends EntityToGroupBox('albc', version, flags) {
        unsigned int(8)[16] group_uuid;
        utf8string group_name;
        utf8string group_description;
        utf8string group_tags ;
        utf8string lang;
}
aligned(8) class FavouriteCollectionEntityToGroupBox
    extends EntityToGroupBox('favc', version, flags) {
        unsigned int(8)[16] group_uuid;
        utf8string group_name;
        utf8string group_description;
        utf8string group_tags ;
        utf8string lang;
}
aligned(8) class AutoExposureBracketingEntityToGroupBox
    extends EntityToGroupBox('aebr', version, flags) {
        unsigned int(8)[16] group_uuid;
        utf8string group_name;
        utf8string group_description;
        utf8string group_tags ;
        utf8string lang;
}
```

Similar syntax may be derived for each capture or collection mode.

Above syntax allows expressing only one language for the human-readable string parameters. It may be desirable to provide such human-readable strings in multiple languages to support alternative internationalization of the user-presentable text (e.g. both Japanese and French).

In a variant, new EntityToGroupBoxes contains a list of alternative human-readable string parameters with their associated language.

The syntax of the generic Grouping Information when described as EntityToGroup is described below (including all optional parameters):

```
aligned (8) class CaptureSeriesEntityToGroupBox
    extends EntityToGroupBox('case', version = 0, flags = 0) {
        unsigned int(32) capture_mode;
        unsigned int(8)[16] group_uuid;
        unsigned int(16) entry_count;
        for (i = 0; i < entry count; i++) {
            utf8string group_name;
            utf8string group_description;
            utf8string group_tags ;
            utf8string lang;
        }
    }
```

Where entry_count provides the number of alternative user-presentable text.

Similarly the syntax of EntityToGroupBoxes with specific grouping_type may be as follows (with same semantics of parameters than above):

```
aligned(8) class AlbumCollectionEntityToGroupBox
    extends EntityToGroupBox('albc', version, flags) {
        unsigned int(8)[16] group_uuid;
        unsigned int(16) entry_count;
        for (i = 0; i < entry_count; i++) {
            utf8string group_name;
            utf8string group_description;
            utf8string group_tags ;
            utf8string lang;
        }
    }
```

It may be desirable to share group properties between groups of entities (thus possibly grouping single images, sequences of images, or both) to avoid duplicating the same information in multiple groups.

According to a second embodiment the new EntityToGroupBox with generic grouping_type (e.g. 'case' or 'lgrp') or with specific grouping_type (e.g. 'aebr', 'albc' . . . ) may only contain the optional group_uuid parameter previously described. All other group properties are described as follows.

Group properties are defined as Box or FullBox rather than as parameters in EntityToGroupBoxes. The box type of the group property specifies the property type. Group properties can be descriptive or transformative. Transformative group properties apply to each item in the group of entities with preceding transformations applied (Transformations associated with items (via 'ipma' box) are applied first, and then transformations associated with the group of entities (as described below) are applied to each item in the group).

A new container box GroupPropertiesBox('gprp') is created in the MetaBox. The GroupPropertiesBox enables the association of any group with an ordered set of group properties. This GroupPropertiesBox consists of two parts: GroupPropertyContainerBox('gpco') that contains an implicitly indexed list of group properties, and one or more GroupPropertyAssociationBox(es)('gpma') that associate groups of entities with group properties.

In an example, each GroupPropertyAssociationBox shall be ordered by increasing group_id, and there shall be at most one occurrence of a given group_id, in the set of GroupPropertyAssociationBox boxes. The version 0 should be used unless 32-bit group_id values are needed; similarly, flags should be equal to 0 unless there are more than 127 properties in the GroupPropertyContainerBox. There shall be at most one GroupPropertyAssociationBox with a given pair of values of version and flags.

The associated syntax is as follows:

```
aligned(8) class GroupProperty(property_type)
    extends Box(property_type)
{
}
aligned(8) class GroupFullProperty(property_type, version, flags)
    extends FullBox(property_type, version, flags)
{
}
aligned(8) class GroupPropertyContainerBox
    extends Box('gpco')
{
    Box properties[ ]; // boxes derived from
        // GroupProperty or GroupFullProperty, or FreeSpaceBox(es)
        // to fill the box
}
aligned(8) class GroupPropertyAssociation Box
    extends FullBox('gpma', version, flags)
{
    unsigned int(32) entry_count;
    for(i = 0; i < entry_count; i++) {
        if (version < 1)
            unsigned int(16) group_id;
        else
            unsigned int(32) group_id;
        unsigned int(8) association_count;
        for (i=0; i<association_count; i++) {
            bit(1) essential;
            if (flags & 1)
                unsigned int(15) property_index;
            else
                unsigned int(7) property_index;
        }
    }
}
Box Type: 'gprp'
Container: MetaBox ('meta')
Mandatory: No
Quantity: Zero or one
aligned(8) class GroupPropertiesBox
    extends Box('gprp') {
    GroupPropertyContainerBox property_container;
    GroupPropertyAssociationBox association[ ];
}
```

Where:

group_id identifies the EntityToGroupBox with which properties are associated.

essential when set to 1 indicates that the associated property is essential to the group, otherwise it is non-essential.

property_index is either 0 indicating that no property is associated (the essential indicator shall also be 0), or is the 1-based index (counting all boxes, including FreeSpace boxes) of the associated property box in the GroupPropertyContainerBox contained in the same GroupPropertiesBox.

According to this second embodiment, human-readable label(s) such as name, tag(s) or description of the content of the group of entities may be defined as a specific GroupDescriptionProperty with for instance a specific FourCC 'gdes' as follows:

```
aligned(8) class GroupDescriptionProperty
    extends GroupFullProperty('gdes', version = 0, flags = 0){
        utf8string name;
        utf8string description;
        utf8string tags ;
        utf8string lang;
    }
```

Where name is a null-terminated UTF-8 character string containing human readable name for the group of entities.

description is a null-terminated UTF-8 character string containing human readable description of the group of entities.

tags is a null-terminated UTF-8 character string containing comma separated tags related to the group of entities.

lang is a character string containing an RFC 5646 compliant language tag string, such as "en-US", "fr-FR", or "zh-CN", representing the language of the text contained in name, description and tags. When lang is empty, the language is unknown/undefined.

According to this second embodiment, it is possible to associate multiple GroupDescriptionProperty with a group via the GroupPropertyAssociationBox to represent different language alternatives.

Alternatively to associate multiple GroupDescriptionProperty with alternative language with a group, the GroupDescriptionProperty may contain a list of alternative name, description and tags as follows:

```
aligned(8) class GroupDescriptionProperty
extends GroupFullProperty('gdes', version = 0, flags = 0){
    unsigned int(16) entry_count;
    for (i = 0; i < entry_count; i++) {
        utf8string group_name;
        utf8string group_description;
        utf8string group_tags ;
        utf8string lang;
    }
}
```

In a variant, each human-readable string can be defined as a separate group property with its associated language for more flexibility. For example, there may be one property for a 'tag' string, one for a 'label' string, and one for a 'description' string.

In above variant, each group property may also contain a list of alternative couple text/language similarly to the description above.

In some cases, same properties may apply to either items or groups of entities. For instance, above GroupDescriptionProperty box can be useful to provide human-presentable description to either items or groups of entities. Similarly item properties may apply to items or to group of items as a whole.

In a variant, rather than defining new boxes to associate group properties with group of entities, group properties are defined as item properties boxes (ItemProperty or ItemFullProperty) and the semantic of the ItemPropertyAssociationBox is modified to be able to refer to items or groups of entities.

For example, the Item PropertyAssociation Box allows referring to an identifier of group (for example to the EntityToGroup::group_id parameter) that groups a series of items or tracks. The item_ID field of the 'ipma' box is then replaced by an item_or_group_id which may refer to either an identifier of Item (item_ID) or to a group identifier (group_id). The advantage of this variant is that the description of the properties is more compact since groups of entities and items may share the same properties and repetition of properties definition and associations is avoided.

Below is an example of a new syntax of the ItemPropertyAssociationBox:

```
aligned(8) class ItemPropertyAssociationBox extends FullBox('ipma',
version, flags)
{
    unsigned int(32) entry_count;
    for(i = 0; i < entry_count; i++) {
        if (version < 1)
            unsigned int(16) item_or_group_ID;
        else
            unsigned int(32) item_or_group_ID;
        unsigned int(8) association_count;
        for (i=0; i<association_count; i++) {
            bit(1) essential;
            if (flags & 1)
                unsigned int(15) property_index;
            else
                unsigned int(7) property_index;
        }
    }
}
```

The semantics of the different parameters of ItemPropertyAssociationBox remain unchanged except item_ID field which is renamed to item_or_group_ID. The item_or_group_ID parameter may refer either to one item or to one EntityToGroup. Thus, the value of item_or_group_ID should be equal to one group_id value or to one item_ID value. It is to be noted that, by definition of the group_id in the standard, a group_id shall not be equal to any other group_id, any item_id, or any track_id. Thus, given an item_or_group_ID, there cannot be ambiguity whether it refers to an item or a group.

As an alternative, to keep backward compatibility with existing version 0 and 1 of the ItemPropertyAssociationBox, new versions 2 and 3 of the ItemPropertyAssociationBox may be proposed and defined as follows:

```
aligned(8) class ItemPropertyAssociationBox extends FullBox('ipma',
version, flags)
{
    unsigned int(32) entry_count;
    for(i = 0; i < entry_count; i++) {
        if (version < 1)
            unsigned int(16) item_ID;
        else if (version == 1)
            unsigned int(32) item_ID;
        else if (version == 2)
            unsigned int(16) group_id
        else
            unsigned int(32) group_id
        unsigned int(8) association_count;
        for (i=0; i<association_count; i++) {
            bit(1) essential;
            if (flags & 1)
                unsigned int(15) property_index;
            else
                unsigned int(7) property_index;
        }
    }
}
```

Each ItemPropertyAssociationBox shall be ordered by increasing item_ID or group_id, and there shall be at most one occurrence of a given item_ID or group_id, in the set of ItemPropertyAssociationBox boxes. The version 0 should be used for associating properties with items unless 32-bit item_ID values are needed, in such case version 1 should be used;

Similarly, the version 2 should be used for associating properties with groups of entities unless 32-bit group_id values are needed, in such case version 3 should be used;

Flags should be equal to 0 unless there are more than 127 properties in the ItemPropertyContainerBox. There shall be at most one ItemPropertyAssociationBox with a given pair of values of version and flags.

In another variant, rather than creating new versions of the existing Item PropertyAssociationBox, a new box EntityTo-GroupAssociationBox 'epma' is created directly into the ItemPropertiesBox, for example as follows:

```
aligned(8) class EntityToGroupAssociationBox extends FullBox('epma',
version, flags)
{
    unsigned int(32) entry_count;
    for(i = 0; i < entry_count; i++) {
    if (version < 1)
        unsigned int(16) group_id;
    else
        unsigned int(32) group_id;
    unsigned int(8) association_count;
    for (i=0; i<association_count; i++) {
        bit(1) essential;
        if (flags & 0x1 == 0x1)
            unsigned int(15) property_index;
        else
            unsigned int(7) property_index;
        }
    }
}
Box Type: 'iprp'
Container: MetaBox ('meta')
Mandatory: No
Quantity: Zero or one
aligned(8) class ItemPropertiesBox
        extends Box('iprp') {
    ItemPropertyContainerBox property_container;
    ItemPropertyAssociationBox association[ ];
    EntityToGroupAssociationBox groupAssociation[ ];
}
```

Each EntityToGroupAssociationBox shall be ordered by increasing group_id, and there shall be at most one occurrence of a given group_id, in the set of EntityToGroupAssociationBox boxes. The version 0 should be used for associating properties with EntityToGroups unless 32-bit group_id values are needed, in such case version 1 should be used;

Flags should be equal to 0 unless there are more than 127 properties in the ItemPropertyContainerBox. There shall be at most one EntityToGroupAssociationBox with a given pair of values of version and flags.

In those variant, human-readable label(s) such as name, tag(s) or description may apply either to items or group of entities. Such labels are defined as a specific descriptive Item Property ItemDescriptionProperty with for instance a specific FourCC 'ides' as follows:

```
aligned(8) class ItemDescriptionProperty
    extends ItemFullProperty('ides', version = 0, flags = 0){
    utf8string name;
    utf8string description;
    utf8string tags ;
    utf8string lang;
}
```

Where name is a null-terminated UTF-8 character string containing human readable name for the item or group of entities.

description is a null-terminated UTF-8 character string containing human readable description of the item or group of entities.

tags is a null-terminated UTF-8 character string containing comma separated tags related to the item or group of entities.

lang is a character string containing an RFC 5646 compliant language tag string, such as "en-US", "fr-FR", or "zh-CN", representing the language of the text contained in name, description and tags. When lang is empty, the language is unknown/undefined.

In a variant, each human-readable string can be defined as separate descriptive item properties with its associated language for more flexibility. For example, there may be one property for a 'tag' string, one for a 'label' string, and one for a 'description' string.

Item Properties are ordered and Item Properties can be either descriptive item properties or transformative item properties as described in standard. Examples of transformative item properties are image rotation or image crop. Examples of descriptive Item Properties are colour information or pixel information.

According to above embodiments, when a descriptive item property is associated with a group of entities, it describes common properties that applies to each entity in the group or it applies to the group of entities as a whole depending on the semantic of the Item Property. Alternatively, a box flag value of 'ipma' box (or 'epma' box depending on embodiment) allows signalling if the descriptive Item Property associations described by the box applies to the group as a whole or to each item in the group. When a transformative Item Property is associated with a group of entities, it applies to each entity in the group with preceding transformations applied, i.e. transformations associated with items (via 'ipma' box) are applied first, and then transformations associated with the group of entities (as described above) are applied in order to each item in the group.

According to previous embodiments, one or more item and/or group properties can be associated with each item or group of entities to describe either the properties of the item by itself or the common properties that apply to a whole group.

However, there are cases where it is also desirable to be able to associate properties with an entity within a limited scope, i.e. to associate properties with an entity that would apply only in the context of a given group of entities.

For instance, a same image may pertain to two different album collections and the user may want to associate different human-presentable texts describing this image in the scope of each album collection. For instance, an image representing a landscape with a car in front of a mountain may be associated with two different album collections, one dedicated to cars and another dedicated to holidays. In the first album collection, the user may want to associate the text "Nice red car!" with the image, while in the second album collection, the user may want to associate the text "My nice holidays at Mountain".

As another example, outside from any collection, an image may be associated in the HEIF file with a transformative Item Property Clean Aperture that realizes a crop of the image. But the user would like to add this image in different collections in same file with different crop parameters.

In both above use cases, it is useful to associate properties to images in the context of a particular group.

In an embodiment, when considering an item pertaining to a group, this item is associated with all the properties that are associated with this item unconditionally (meaning not within the scope of a group) and the properties associated with this item within the scope of the group. When a same property is defined unconditionally and within the scope of the group, the property defined within the scope of the group has the precedence and its value overwrites the value defined in the unconditional property.

According to a third embodiment, the new EntityToGroupBoxes that describe capture series or collection group, either the generic ones (thus CaptureSeriesEntityToGroupBox or LogicalEntityToGroupBox), or the specific ones (thus FavouriteCollectionEntityToGroupBox, AlbumCollectionEntityToGroupBox or AutoExposureBracketingEntityToGroupBox), introduced in the first embodiment are extended to associate a list of property index with each entity in the group as illustrated in examples below:

```
aligned(8) class CaptureSeriesEntityToGroupBox
    extends EntityToGroupBox('case', version, flags) {
        unsigned int(32) capture_mode;
        for(i = 0; i < num_entities_in_group; i++) {
            unsigned int(32) entity_id;
            unsigned int(8) association_count;
            for (i=0; i<association_count; i++) {
                bit(1) essential;
                if (flags & 0x1 == 0x1)
                    unsigned int(15) property_index;
                else
                    unsigned int(7) property_index;
            }
        }
}
```

Where capture_mode identifies the capture or collection mode.

num_entities_in_group is inherited from EntityToGroupBox and represents the number of entities (item or track) in the group.

entity_id identifies the entity with which properties are associated essential when set to 1 indicates that the associated property is essential to the item, otherwise it is non-essential.

property_index is either 0 indicating that no property is associated (the essential indicator shall also be 0), or is the 1-based index (counting all boxes, including FreeSpace boxes) of the associated property box in the ItemPropertyContainerBox contained in the ItemPropertiesBox present at the same level than the enclosing GroupListBox.

Similar example and parameter semantics illustrate the case of EntityToGroupBox with specific grouping_type per type of capture or collection mode as follows:

```
aligned(8) class AlbumCollectionEntityToGroupBox
    extends EntityToGroupBox('albc', version, flags) {
        for(i = 0; i < num_entities_in_group; i++) {
            unsigned int(32) entity_id;
            unsigned int(8) association_count;
            for (i=0; i<association_count; i++) {
                bit(1) essential;
                if (flags & 0x1 == 0x1 )
                    unsigned int(15) property_index;
                else
                    unsigned int(7) property_index;
            }
        }
}
```

Figure 5:
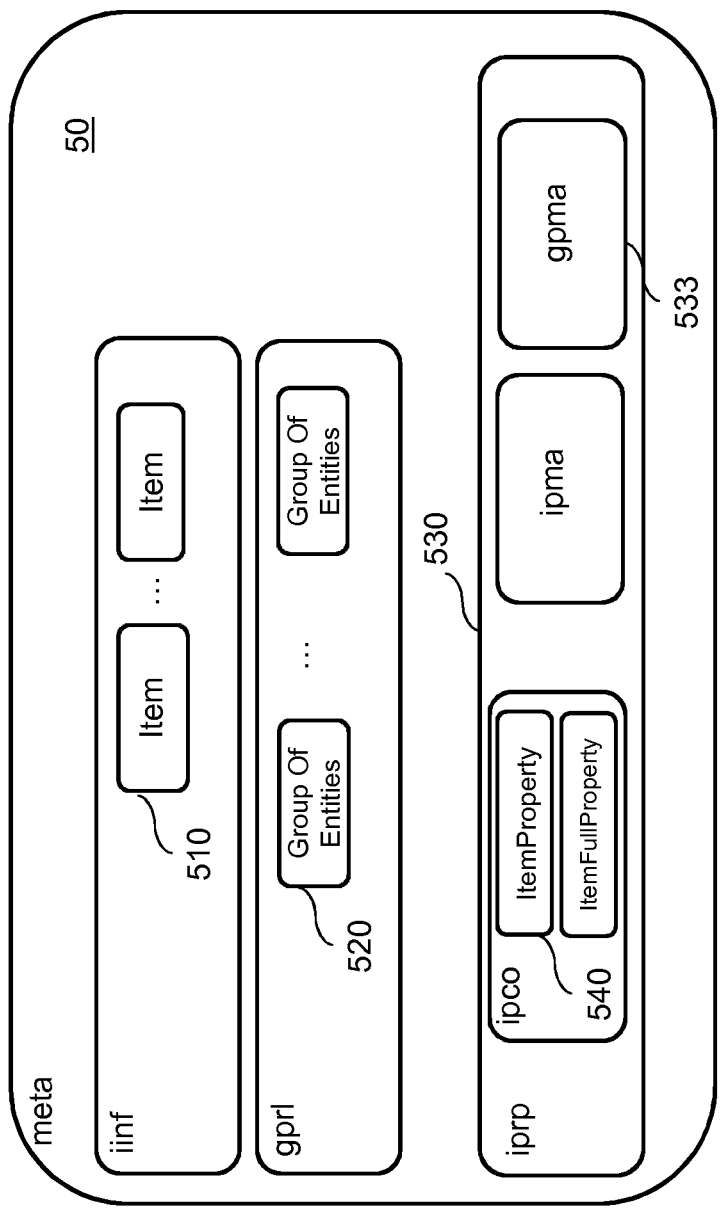
FIG. 5 illustrates an example of association of item properties with an item within the scope of a group of entities.

In a variant as illustrated on FIG. 5, the association of item properties 540 with an item 510 within the scope of a group 520 is performed directly in the ItemPropertiesBox 530 in MetaBox 50. A new box 533 is defined in ItemPropertiesBox as follows:

```
aligned(8) class ItemPropertyInGroupAssociationBox extends FullBox
('gpma', version, flags)
{
    unsigned int(32) group_entry_count;
    for (i = 0; i < group_entry_count; i++) {
        if (version < 1)
            unsigned int(16) group_id;
        else
            unsigned int(32) group_id;
        unsigned int(32) entry_count;
        for(i = 0; i < entry_count; i++) {
            if (version < 1)
                unsigned int(16) item_ID;
            else
                unsigned int(32) item_ID;
            unsigned int(8) association_count;
            for (i = 0; i < association_count; i++) {
                bit(1) essential;
                if (flags & 0x1 == 0x1)
                    unsigned int(15) property_index;
                else
                    unsigned int(7) property_index;
            }
        }
    }
}
Box Type: 'iprp'
Container: MetaBox ('meta')
Mandatory: No
Quantity: Zero or one
aligned(8) class Item PropertiesBox
    extends Box('iprp') {
        ItemPropertyContainerBox property_container;
        Item PropertyAssociationBox association[ ];
        ItemPropertyInGroupAssociationBox itemInGroupAssociation[ ];
}
```

Where group_entry_count provides the number of entries in the list of groups.

group_id identifies the group that defines the context in which properties are associated.

entry_count provides the number of entries in the list of items in the group.

Item_ID identifies the item with which properties are associated.

essential when set to 1 indicates that the associated property is essential to the item, otherwise it is non-essential property_index is either 0 indicating that no property is associated (the essential indicator shall also be 0), or is the 1-based index (counting all boxes, including FreeSpace boxes) of the associated property box in the ItemPropertyContainerBox contained in the same ItemPropertiesBox.

In a variant, item_ID may be replaced with entity_ID to designate either an item_ID or a track_ID in the associated EntityToGroupBox with EntityToGroupBox::group_id== group_id.

Each ItemPropertyInGroupAssociationBox shall be ordered by increasing group_id and item_ID, and there shall be at most one occurrence of a given group_id, in the set of ItemPropertyInGroupAssociationBox boxes. The version 0 should be used unless 32-bit item_ID values are needed; similarly, flags should be equal to 0 unless there are more than 127 properties in the ItemPropertyContainerBox. There shall be at most one ItemPropertyAssociationBox with a given pair of values of version and flags. In another variant, rather than defining a new box in ItemPropertiesBox, the existing ItemPropertyAssociationBox ('ipma') may be extended with a new version equals to 2 as follows:

```
aligned(8) class ItemPropertyAssociationBox extends FullBox('ipma',
version, flags)
{
    if (version == 2)
        unsigned int(32) group_id;
    unsigned int(32) entry_count;
    for(i = 0; i < entry_count; i++) {
        if (version < 1)
            unsigned int(16) item_ID;
        else
            unsigned int(32) item_ID;
        unsigned int(8) association_count;
        for (i=0; i<association_count; i++) {
            bit(1) essential;
            if (flags & 0x1 == 0x1)
                unsigned int(15) property_index;
            else
                unsigned int(7) property_index;
        }
    }
}
```

Where when the version equals 2, a new attribute group_id limits the scope of the association between item_ID and property_index to the context of the EntityToGroupBox with same group_id value.

Each ItemPropertyAssociationBox shall be ordered by increasing item_ID (and group_id if present).

There shall be at most one occurrence of a given group_id in the set of ItemPropertyAssociationBox boxes.

There shall be at most one occurrence of a given item_ID in the set of ItemPropertyAssociationBox boxes with version 0 and 1.

1st-bit (LSB) flags should be equal to 0 unless there are more than 127 properties in the ItemPropertyContainerBox.

There shall be at most one ItemPropertyAssociationBox with a given pair of values of version and flags with version 0 or 1.

In HEIF standard, Item Properties are ordered and Item Properties can be either descriptive item properties or transformative item properties. According to some embodiments, multiple item properties with same type can be associated with same item, either globally or in the scope of a particular group. For instance, a transformative item property Image rotation (of type Iron may be associated with an item in a general scope using an ItemPropertyAssociationBox with version 0 or 1. Simultaneously, the same item may be associated with another item property Image rotation (of type Iron in the limited scope of a given group, for instance using an ItemPropertyAssociationBox with version 2.

In such case, according to some embodiments, transformative item properties apply to the item with preceding transformations applied and for items in the scope of a given group, transformative item properties in general scope apply before transformative item properties in the scope of this given group. On contrary, for descriptive item properties, descriptive item properties associated with an item in the scope of a group supersedes the descriptive item properties with same type associated with same item in general scope.

Alternatively, an additional 1-bit attribute supersede_in_group_flag is added in the new version of ItemPropertyAssociationBox to signal if Item Properties associated in the scope of a group supersedes or not Item Properties with same type associated with same item in general scope.

An example of syntax of the ItemPropertyAssociationBox with this additional attribute is described below

```
aligned(8) class ItemPropertyAssociationBox extends
FullBox('ipma', version, flags)
{
    if (version == 2)
        unsigned int(32) group_id;
    unsigned int(32) entry_count;
    for(i = 0; i < entry_count; i++) {
        if (version < 1)
            unsigned int(16) item_ID;
        else
            unsigned int(32) item_ID;
        unsigned int(8) association_count;
        for (i=0; i<association_count; i++) {
            bit(1) essential;
            if (version == 2){
                bit(1) supersede_in_group_flag;
                if (flags & 0x1 == 0x1)
                    unsigned int(14) property_index;
                else
                    unsigned int(6) property_index;
            }
            else {
                if (flags & 0x1 == 0x1)
                    unsigned int(15) property_index;
                else
                    unsigned int(7) property_index;
            }
        }
    }
}
```

Where when the version equals 2, a new attribute group_id limits the scope of the association between item_ID and property_index to the context of the EntityToGroupBox with same group_id value. Moreover, a new 1-bit attribute (supersede_in_group_flag) when set to 1 indicates that the associated property supersedes property with same type in general scope, if any, otherwise the associated property applies in order after properties with same type associated with same item in general scope.

Alternatively, the supersede_in_group_flag value may be signalled as a particular flag value in the flags parameter of the ItemPropertyAssociationBox. In such case, the supersede_in_group_flag value applies to all property associations declared in the Item PropertyAssociation Box.

According to a fourth embodiment new versions (version=2 and version=3) of the ItemPropertyAssociationBox ('ipma') with new flags is defined to deal with all versions of this single metadata structure providing all possible association of Item Properties with either items, groups of entities, or items within a group of entities.

Figure 6:
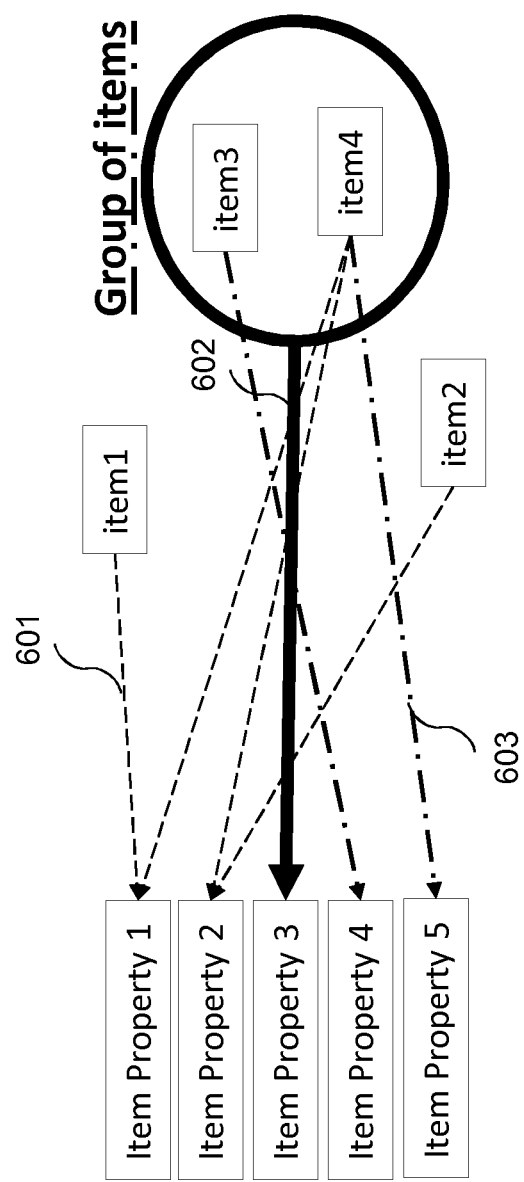
FIG. 6 illustrates the different associations between item properties and items, groups of entities, or items within the scope of a group of entities according to some embodiments of the invention.

FIG. 6 illustrates the different associations between item properties and items, groups of entities, or items within the scope of a group of entities according to some embodiments of the invention.

Relation 601 between an item property 1 and an item1 illustrates an association of an item property with an item. This association is valid within the scope of the file; this is a general association.

Relation 602 between item property 3 and the group of items composed by item3 and item4, illustrates an association of an item property with a group of items.

Relation 603 between item4 and item property 5 illustrates an association of an item property with an item within the scope of the group of items composed of item3 and item4.

It may be noted that, independently of its belonging to the group of items, item4 is associated unconditionally to item property 1 and item property 2.

According to this embodiment, the ItemPropertyAssociationBox may be defined for example as follows:

The following flags are allowed to be set in the 'ipma' box flags:

0x000001 indicates the size of property_index attribute;
When this bit is set, property_index_size=15
Otherwise, property_index_size=7

0x000002 indicates the size of item_ID and group_id attributes;
When this bit is set, item_or_group_ID_size=32
Otherwise, item_or_group_ID_size=16

```
aligned(8) class ItemPropertyAssociationBox extends FullBox('ipma',
version, flags)
{
    if (version == 2)
        unsigned int(item_or_group_ID_size ) context_group_id;
    unsigned int(32) entry_count;
    for(i = 0; i < entry_count; i++) {
        if (version < 1)
            unsigned int(16) item_ID;
        else if (version == 1)
            unsigned int(32) item_ID;
        else if (version == 2)
            unsigned int(item_or_group_ID_size) item_ID;
        else
            unsigned int(item_or_group_ID_size) group_id;
        unsigned int(8) association_count;
        for (i=0; i<association_count; i++) {
            bit(1) essential;
            if (version == 2){
                bit(1) supersede_in_group_flag;
                unsigned int(property_index_size-1) property_index;
            }
            else
                unsigned int(property_index_size) property_index;
        }
    }
}
```

Where context_group_id limits the scope of the association between item_ID and property_index to the context of the EntityToGroupBox with same group_id value.

group_id identifies the EntityToGroupBox with which properties are associated.

essential when set to 1 indicates that the associated property is essential to the group, otherwise it is non-essential.

supersede_in_group_flag when set to 1 indicates that the associated property supersedes property with same type in general scope, if any, otherwise the associated property applies in order after properties with same type associated with same item in general scope.

property_index is either 0 indicating that no property is associated (the essential indicator shall also be 0), or is the 1-based index (counting all boxes, including FreeSpace boxes) of the associated property box in the GroupPropertyContainerBox contained in the same GroupPropertiesBox.

The definition of version 2 and 3 of 'ipma' box is backward compatible and does not modify existing version 0 and 1 of the 'ipma' box.

Each ItemPropertyAssociationBox shall be ordered by increasing item_ID or group_id (and context_group_id if present).

There shall be at most one occurrence of a given context_group_id in the set of ItemPropertyAssociationBox boxes.

There shall be at most one occurrence of a given item_ID and group_id in the set of ItemPropertyAssociationBox boxes with version 0, 1 or 3.

1st-bit (LSB) flags should be equal to 0 unless there are more than 127 properties in the ItemPropertyContainerBox.

There shall be at most one ItemPropertyAssociationBox with a given pair of values of version and flags with values 0x1 or 0x2 except for version=2.

Alternatively to previous embodiment, the ItemPropertyAssociationBox may be defined for example as follows:

The following flags are allowed to be set in the 'ipma' box flags:

0x000001 indicates the size of property_index attribute;
When this bit is set, property_index_size=15
Otherwise, property_index_size=7

0x000002 indicates the size of item_ID and group_id attributes;
When this bit is set, item_or_group_ID_size=32
Otherwise, item_or_group_ID_size=16

0x000004 group_limited_scope
When this bit is set, it indicates that the associations declared in this box are limited to the scope of the group identified by the attribute context_group_id.

```
aligned(8) class ItemPropertyAssociationBox extends FullBox('ipma',
version, flags)
{
    if (version > 1 && group_limited_scope)
        unsigned int(item_or_group_ID_size ) context_group_id;
    unsigned int(32) entry_count;
    for(i = 0; i < entry_count; i++) {
        if (version < 1)
            unsigned int(16) item_ID;
        else if (version == 1)
            unsigned int(32) item_ID;
        else if (version > 1 && group_limited_scope)
            unsigned int(item_or_group_ID_size) item_ID;
        else
            unsigned int(item_or_group_ID_size) group_id;
        unsigned int(8) association_count;
        for (i=0; i<association_count; i++) {
            bit(1) essential;
            if (version > 1 && group_limited_scope){
                bit(1) supersede_in_group_flag;
                unsigned int(property_index_size-1) property_index;
            }
            else
                unsigned int(property_index_size) property_index;
        }
    }
}
```

Where context_group_id limits the scope of the association between item_ID and property_index to the context of the EntityToGroupBox with same group_id value.

group_id identifies the EntityToGroupBox with which properties are associated.

essential when set to 1 indicates that the associated property is essential to the group, otherwise it is non-essential.

supersede_in_group_flag when set to 1 indicates that the associated property supersedes property with same type in general scope, if any, otherwise the associated property applies in order after properties with same type associated with same item in general scope.

property_index is either 0 indicating that no property is associated (the essential indicator shall also be 0), or is the 1-based index (counting all boxes, including FreeSpace boxes) of the associated property box in the GroupPropertyContainerBox contained in the same GroupPropertiesBox.

The definition of version 2 of 'ipma' box is backward compatible and does not modify existing version 0 and 1 of the 'ipma' box.

Each ItemPropertyAssociationBox shall be ordered by increasing item_ID or group_id (and context_group_id if present).

There shall be at most one occurrence of a given context_group_id in the set of ItemPropertyAssociationBox boxes.

There shall be at most one occurrence of a given item_ID and group_id in the set of ItemPropertyAssociationBox boxes for which group_limited_scope is not set 1st-bit (LSB) flags should be equal to 0 unless there are more than 127 properties in the ItemPropertyContainerBox.

There shall be at most one ItemPropertyAssociationBox with a given pair of values of version and flags except for boxes with flag group_limited_scope present.

Figure 7:
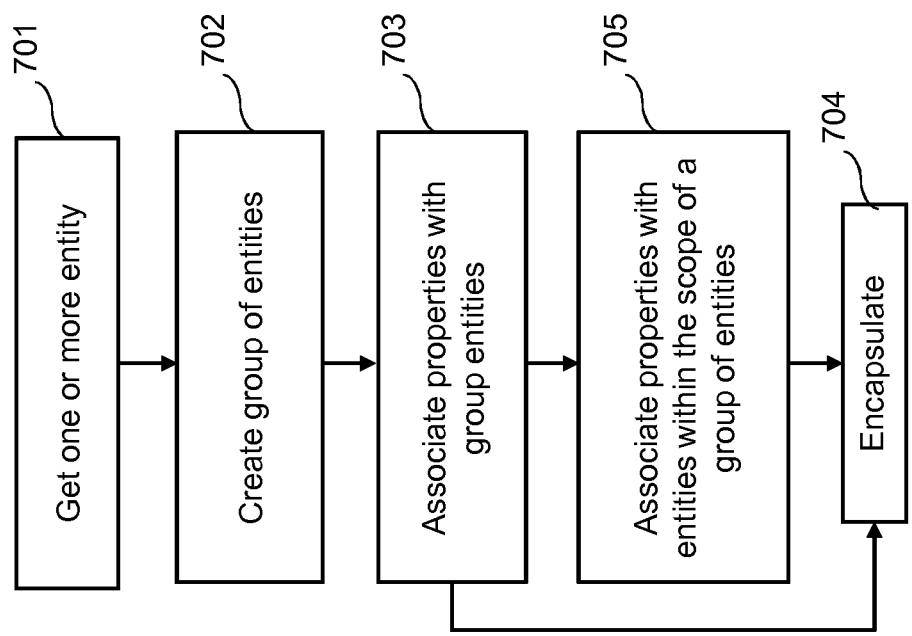
FIG. 7 illustrates the main steps of a process for encapsulating one or more entities in one file using HEIF format according to some embodiments of the invention.

FIG. 7 illustrates the main steps of a process for encapsulating one or more entities in one file using HEIF format. A computing device 900 (FIG. 9) may for instance apply this processing.

First, one or more entities are obtained in step 701. They can be obtained according to a capture mode by a capturing device as described above.

In an alternative, the one or more entities obtained in step 701 can be selected among existing or previously captured or created entities. For instance, existing entities can be extracted from an existing HEIF file or from any other type of files, for instance JPEG, GIF, BMP, MKV, MP4 or AVI.

At step 702, one or more new groups of entities are created. Those groups may result from the selected capture mode at capture time, i.e. a new group is created for each set of entities resulting from applying a capture mode during capture of images. For example, at capture-time, a time-lapse is realized containing an image every second. The time-lapse images are grouped together in a same group at the end of the capture. Another example, an auto-exposure bracketing group is created to group together all images resulting from an auto-exposure bracketing capture. New groups of entities may also be created during an editing operation performed by an automatic process or by a user or the creator of a HEIF file. For instance, groups of entities can be created to logically grouped entities such as for creating user's collections or user's favourites or photo series or a set of photos or user defined capture series. A user may for instance groups several entities to form a collection of images. An automatic process may for instance groups the photo shot in the same location or/and within a predetermined interval of time. For instance, the capture device uses the location information (for instance from a GPS sensor) of the capture image to determine the name of the town corresponding to the location. All the images taken in the same town form one group of images. For instance, the capture or editing device may use artificial intelligence algorithms (e.g. face or object recognition) to categorize images and group them together.

At step 703, several properties may be associated to each group to describe more precisely the object of the group. For instance, a group may be associated with tag(s), label(s), name(s), descriptive text(s) of the content, location coordinates, common parameters of a capture mode. For instance, common parameters of a capture mode may be related to the timing (e.g. acquisition frame rate or time delta between successive images), differences in capture parameters variations (e.g. exposure step) between successive captures, or properties of the bracketing mode (e.g. continuous, single or auto bracketing, or panorama direction).

In some embodiments, in an optional step 705, several properties may be associated to entities pertaining to a group of entities, the association being only valid within the scope of the group. This means that the property applies to the entity only when the entity is considered as being part of the group. If the entity is considered independently of the group, then the property doesn't apply to the entity.

Finally at step 704, images and sequences of entities are encapsulated in HEIF file format with metadata structures describing them and describing the created groups of entities with their associated properties For the storage of images, two main alternative possibilities are available.

In the first alternative, images are encoded independently and stored in the file as HEIF items. During this encapsulation step, additional information on the condition of capture may be provided in the file. For example, for auto exposure bracketing mode, the exposure data used for the capture of each image may be provided. This description is provided using properties in an ItemProperty box.

In a second alternative, images are stored in a 'pict' or 'vide' track. Additional information may be provided using SampleEntry or SampleGroupEntry boxes. The encoding of images may depend on previous images using an HEVC encoder similarly to video encoding. Previous images in the track are available as reference image for predictive encoding.

The storage of the captured images as a group of images is signaled in the file using the available EntityToGroup grouping mechanism previously described.

Figure 8:
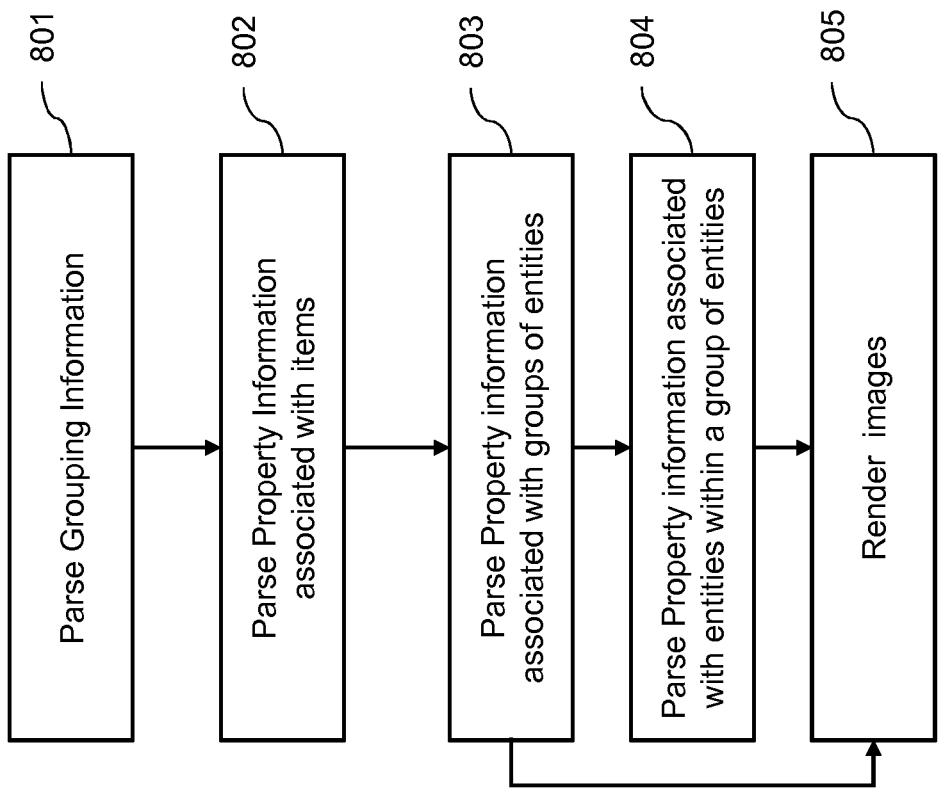
FIG. 8 illustrates the main steps of a parsing process of an HEIF file generated according to some embodiments of the invention.

FIG. 8 illustrates the main steps of a parsing process of an HEIF file generated by the encapsulating process of FIG. 7 to determine the properties associated with a group of entities and the properties associated with an entity (item or track) within the scope of a group. The decoding process starts by the parsing of an HEIF file with one or more images (items) or sequences of images ('pict' or 'vide' tracks). In a step 801 the Grouping Information contained in the GroupsListBox is parsed to determine groups of entities. The grouping type of each group of entities is determined when the Grouping Information is present i.e. the HEIF file includes an EntityToGroupBox with a grouping_type equal to one of the value previously described. In a first alternative, the grouping_type parameter specifies directly the grouping mode. In a second alternative, the Grouping Information signals that the set of images belong to a generic capture series or collection group (the grouping type is equal to 'case', 'brak', 'udcs', or any other FourCC with similar meaning)). In this case, an additional attribute of the EntityToGroupBox provides the particular grouping mode.

Property Information associated with each items is parsed at step 802 by parsing the ItemPropertiesBox ('iprp') and using the ItemPropertyAssociationBoxes (version 0 or version 1) to retrieve each ItemProperty or ItemFullProperty from the ItemPropertyContainerBox that is associated with a particular item.

Property Information associated with each group of entities is parsed at step 503 by parsing the additional attributes defined in the respective EntityToGroupBox. In an alternative, Property Information associated with each group of entities is obtained by parsing a dedicated box GroupPropertiesBox ('gprp') and using the GroupPropertyAssociationBoxes to retrieve each ItemProperty or ItemFullProperty from the GroupPropertyContainerBox that is associated with a particular group. In another alternative, Property Information associated with each group of entities is obtained by parsing the ItemPropertiesBox ('gprp') and using dedicated ItemPropertyAssociationBoxes (version>=2) to retrieve each ItemProperty or ItemFullProperty from the ItemPropertyContainerBox that is associated with a particular group.

In some embodiments, property information associated with each items in the scope of a particular group of entities is parsed in an optional step 804 by parsing the additional attributes defined in the respective EntityToGroupBox providing the index of itemProperties or directly the itemProperties associated with each item in that group. In an alternative, Property Information associated with each items in the scope of a particular group of entities is obtained by parsing the ItemPropertiesBox ('gprp') and using dedicated ItemPropertyAssociationBoxes (version>=2) to retrieve each ItemProperty or ItemFullProperty from the ItemPropertyContainerBox that is associated with the item in the scope of a particular group.

At step 805 the decoder provides to the player all grouping information and property information associated with items, group of entities and entities within a group of entities. The GUI interface may indicate specific GUI elements to allow a user to navigate between the images, sequences of images and groups of such entities using associated respective Property Information. From this Property information the user may select to render part of images contained in the HEIF file.

For instance, HEIF file contains a series of bracketing images. In such a case, the application provides a GUI interface that permits to view the different bracketing alternatives. In one embodiment, the interface provides the information provided in the Property Information such as the ItemProperties to extract the characteristics of the capture associated to each image (including both Property Information from the group and Property Information of each image within the scope of the group). In particular, for auto exposure bracketing the exposure stop of each shot are displayed at step 805 in order to allow a user to select the appropriate shot. Upon selection of the preferred exposure, the decoding device may modify the HEIF file to mark the selected image as "primary item".

When the capture mode corresponds to a Panorama image, the decoder notifies in step 505 the player that HEIF file contains a series of images in which the user may navigate. The GUI interface may indicate specific GUI elements to allow a user to navigate between the images as a spatial composition. The player parses the Property Information of the group to extract the pattern of capture of the set images (for example from left to right) in order to generate a navigation interface adapted to the pattern. For example, if the pattern of capture is from left to right, the GUI interface provides horizontal navigation arrows to navigate between the items of the HEIF file.

When the capture mode corresponds to a Photo Series or an Image Burst, the decoder notifies in step 805 the player, for example, to start a diaporama between all the images of the Photo Series or Image Burst group. In one embodiment, the display time of each image in the diaporama is a function of the timing Interval specified in Property Information of Image burst group.

In one embodiment, the player displays the label or name information provided in the Property Information at the beginning of the diaporama or as a watermarking in each image to allow the user to identify rapidly the content of the Photo Series. In another embodiment, the user may select one image as the preferred image from the series of images of the Photo series group. In such a case, the preferred image is marked as the Primary Item. In another embodiment, the user may select several images as preferred images from the Photo Series. In such a case, the player creates a new Photo Series group with the selected images and associates the same label Property Information.

Figure 9:
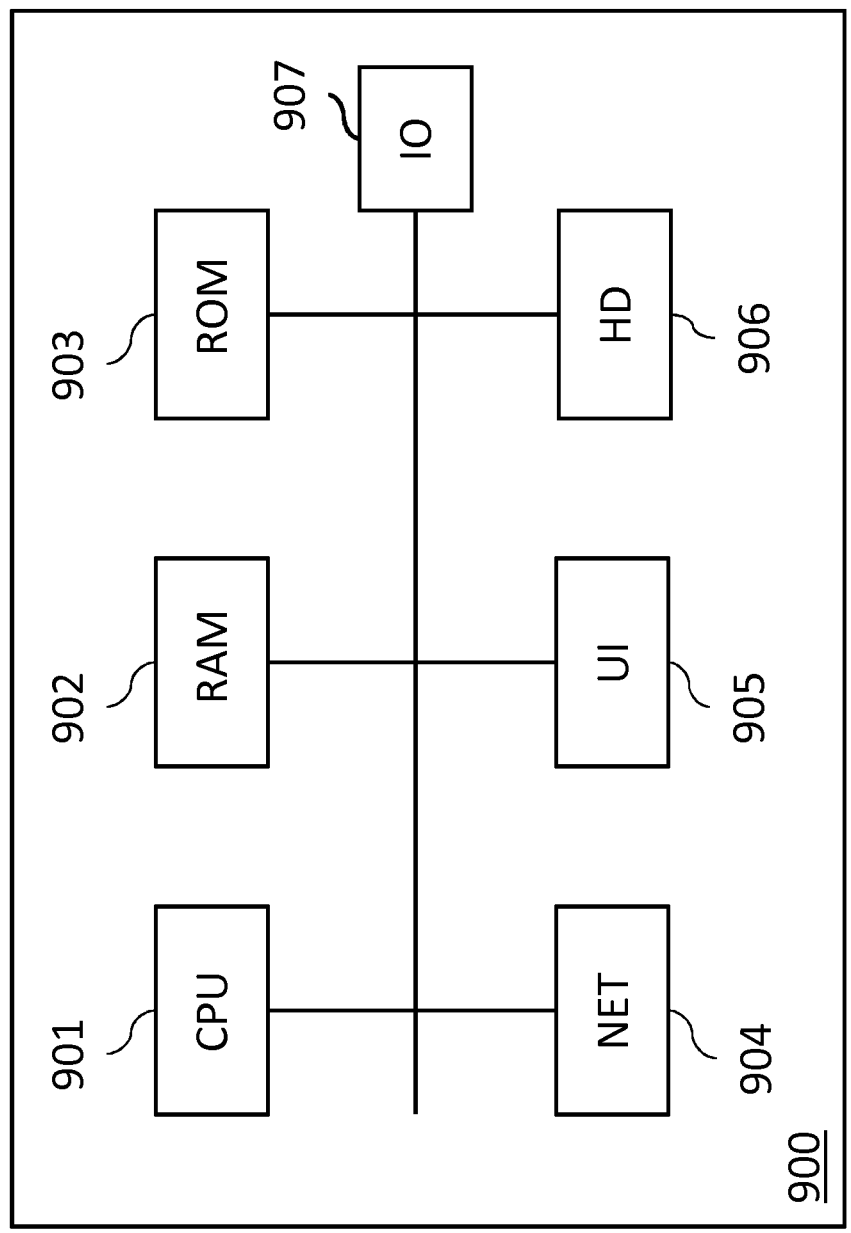
FIG. 9 is a schematic block diagram of a computing device for implementation of one or more embodiments of the invention.

FIG. 9 is a schematic block diagram of a computing device 900 for implementation of one or more embodiments of the invention. The computing device 900 may be a device such as a micro-computer, a workstation or a light portable device. The computing device 900 comprises a communication bus connected to:

a central processing unit 901, such as a microprocessor, denoted CPU;

a random access memory 902, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;

a read only memory 903, denoted ROM, for storing computer programs for implementing embodiments of the invention;

a network interface 904 is typically connected to a communication network over which digital data to be processed are transmitted or received. The network interface 904 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 901;

a user interface 905 may be used for receiving inputs from a user or to display information to a user;

a hard disk 906 denoted HD may be provided as a mass storage device;

an I/O module 907 may be used for receiving/sending data from/to external devices such as a video source or display.

The executable code may be stored either in read only memory 903, on the hard disk 906 or on a removable digital medium such as for example a disk. According to a variant, the executable code of the programs can be received by means of a communication network, via the network interface 904, in order to be stored in one of the storage means of the communication device 900, such as the hard disk 906, before being executed.

The central processing unit 901 is adapted to control and direct the execution of the instructions or portions of software code of the program or programs according to embodiments of the invention, which instructions are stored in one of the aforementioned storage means. After powering on, the CPU 901 is capable of executing instructions from main RAM memory 902 relating to a software application after those instructions have been loaded from the program ROM 903 or the hard-disc (HD) 906 for example. Such a software application, when executed by the CPU 901, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating images in a file, wherein the method comprises:
    generating grouping type information data identifying a capture mode or a collection mode of the images;
    generating data structures describing a plurality of image items or samples from the images;
    generating a grouping data structure describing a group of image items or samples from the plurality of image items or samples, the grouping data structure comprising data for identifying the image items or samples of the group and the grouping type information data; and
    embedding the grouping data structure, the data structures describing the plurality of image items or samples, and the images in the file,
    wherein the grouping data structure and the data structures describing the plurality of image items or samples are embedded in a meta data part of the file.

2. The method of claim 1, wherein a first property data structure associated with the grouping data structure is further embedded within the file.

3. The method of claim 2, wherein the first property data structure is one of a SampleEntry box, a VisualSampleGroupEntry, a ItemFullProperty box or a ItemProperty box as defined in ISO Base Media File Format.

4. The method according to claim 1, wherein data structures are boxes as defined in ISO Base Media File Format.

5. The method of claim 1, wherein grouping type information data are defined for at least one of the capture modes or collection modes comprising auto exposure bracketing mode, white balance bracketing mode, focus bracketing mode, flash exposure bracketing mode, depth of field bracketing mode, iso bracketing mode, time lapse mode, panorama mode, image burst mode, user-defined collection mode, super resolution mode, multi-exposure mode, noise reduction mode, long-exposure noise reduction mode, vignetting compensation mode, and/or HDR capture mode.

6. The method of claim 1, wherein the grouping data structure is one of an EntityToGroup box, a SampleToGroup box, or a TrackGroup box as defined in ISO Base Media File Format.

7. A computer-readable storage medium storing instructions of a computer program for implementing the method according to claim 1.

8. The method of claim 1, wherein the method further comprising generating a second property data structure comprising the grouping type information data and property information based on the capture mode or collection mode, the second property data structure being associated with at least one of the images.

9. The method of claim 8, wherein the second property data structure is one of a SampleEntry box, a VisualSampleGroupEntry, a ItemFullProperty box or a ItemProperty box as defined in ISO Base Media File Format.

10. A method of encapsulating images in a file, wherein the method comprises:
    determining a label parameter describing information comprising a human-readable name to annotate images;
    generating a plurality of image items describing the images, the image items comprising an item identifier;
    generating a grouping data structure describing a group of image items from the plurality of image items, the grouping data structure comprising a group identifier and item identifiers of image items of the group;
    generating a property data structure comprising the label parameter and a data structure associating the property data structure with the grouping data structure using the group identifier and/or with an image item of the group using the item identifier of the image item; and
    embedding the grouping data structure, the plurality of image items, the property data structure and the images in the file, wherein the grouping data structure and the property data structure are embedded in a meta data part of the file.

11. The method according to claim 10, wherein data structures are boxes as defined in ISO Base Media File Format or High Efficiency.

12. A computer-readable storage medium storing instructions of a computer for implementing the method according to claim 10.

13. A device for encapsulating images in a file, wherein the device comprises circuitry configured for:
    generating grouping type information data identifying a capture mode or a collection mode of the images;
    generating data structures describing a plurality of image items or samples from the images;
    generating a grouping data structure describing a group of image items or samples from the plurality of image items or samples, the grouping data structure comprising data for identifying the image items or samples of the group and the grouping type information data; and
    embedding the grouping data structure, the data structures describing the plurality of image items or samples, and the images in the file,
    wherein the grouping data structure and the data structures describing the plurality of image items or samples are embedded in a meta data part of the file.

14. A device for encapsulating images in a file, wherein the device comprises a processor configured for:
    determining a label parameter describing information comprising a human readable name to annotate images;

generating a plurality of image items describing the images, the image items comprising an item identifier;

generating a grouping data structure describing a group of image items from the plurality of image items, the grouping data structure comprising a group identifier and item identifiers of image items of the group;

generating a property data structure comprising the label parameter and a data structure associating the property data structure with the grouping data structure using the group identifier and/or with an image item of the group using the item identifier of the image item; and embedding the grouping data structure, the plurality of image items, the property data structure and the images in the file, wherein the grouping data structure and the property data structure are embedded in a meta data part of the file.

15. A device for encapsulating media data in a file, wherein the device comprises circuitry configured for:

generating a grouping data structure describing a group of entities, each entity corresponding to at least a portion of media data, the grouping data structure comprising a group identifier;

generating a property container data structure containing a property associated with a group of entities;

generating an association data structure comprising association information between the property and the grouping data structure using the group identifier;

generating a property data structure comprising the property container data structure and the association data structure; and embedding the grouping data structure, the property data structure, and the media data in the file, wherein the property of the media data in the file is more compact by avoiding repetition of association information between the property and the group of entities.

16. A method of encapsulating media data in a file, wherein the method comprises:

generating a grouping data structure describing a group of entities, each entity corresponding to at least a portion of media data, the grouping data structure comprising a group identifier;

generating a property container data structure containing a property associated with a group of entities;

generating an association data structure comprising association information between the property and the grouping data structure using the group identifier;

generating a property data structure comprising the property container data structure and the association data structure; and embedding the grouping data structure, the property data structure, and the media data in the file, wherein the property of the media data in the file is more compact by avoiding repetition of association information between the property and the group of entities.

17. The method of claim 16, further comprising:

generating a text property in the property container data structure comprising at least one text attribute associated with a group of entities and a language attribute associated with the at least one text attribute.

18. The method of claim 17, wherein the text property comprises a plurality of the same text attribute associated with a respective plurality of language attributes.

19. The method of claim 17, wherein the property container data structure comprises a first and second text properties, the first text property comprising a text attribute associated with a first language attribute, and the second text property comprising the text attribute associated with a second language attribute, the first language attribute being different from the second language attribute, and wherein the association data structure comprises association information between the first and second text properties, and the grouping data structure.

20. The method of claim 16, wherein the text property comprises a plurality of text attributes comprising a name text attribute, a description text attribute, and a tag text attribute.

21. The method of claim 16, wherein the method comprises:

generating at least one of a name text property, a description text property, and/or a tag text property in the property container data structure, each of the text properties comprising at least a text attribute associated with a group of entities and a language attribute associated with the text attribute.

22. The method of claim 21, wherein each text property comprises a plurality of the same text attribute associated with a respective plurality of language attributes.

23. The method of claim 16, wherein the property container data structure comprises a first and second text properties, the first text property comprising a text attribute associated with a first language attribute, and the second text property comprising the text attribute associated with a second language attribute, the first language attribute being different from the second language attribute, and wherein the association data structure comprises association information between the first and second text properties, and the grouping data structure.

24. The method of claim 16, wherein the association data structure further comprises at least an association of a property with an entity.

25. A computer-readable storage medium storing instructions of a computer program for implementing the method according to claim 16.

* * * * *